(12) United States Patent
Nakajima et al.

(10) Patent No.: US 8,675,127 B2
(45) Date of Patent: Mar. 18, 2014

(54) IMAGING DEVICE

(75) Inventors: Mitsuru Nakajima, Atsugi (JP); Tetsuya Ogata, Machida (JP); Kenichi Yoshimura, Kawasaki (JP); Kohei Shimizu, Ebina (JP); Chihiro Tanaka, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 167 days.

(21) Appl. No.: 13/303,531

(22) Filed: Nov. 23, 2011

(65) Prior Publication Data

US 2012/0133825 A1    May 31, 2012

(30) Foreign Application Priority Data

Nov. 25, 2010  (JP) ................. 2010-261931

(51) Int. Cl.
 *H04N 5/225* (2006.01)
 *G02B 7/02* (2006.01)
(52) U.S. Cl.
 USPC ............................ 348/374; 348/359; 359/819
(58) Field of Classification Search
 USPC .......... 348/291, 360, 373–375, 335; 359/425, 359/703–704, 826–827; 156/73.1–73.3, 156/580.1–580.2
 See application file for complete search history.

(56) References Cited

U.S. PATENT DOCUMENTS

| | | | |
|---|---|---|---|
| 6,693,348 B2 | 2/2004 | Nakajima | |
| 6,762,492 B2 | 7/2004 | Nakajima et al. | |
| 6,870,275 B2 | 3/2005 | Nakajima | |
| 7,016,121 B2* | 3/2006 | Kawanabe et al. | 359/694 |
| 7,367,724 B2* | 5/2008 | Matsushita et al. | 396/529 |
| 7,561,348 B2 | 7/2009 | Nakajima et al. | |
| 7,577,076 B2 | 8/2009 | Ogata et al. | |
| 7,660,226 B2 | 2/2010 | Ogata | |
| 7,729,226 B2 | 6/2010 | Ogata | |
| 7,738,340 B2 | 6/2010 | Hirai et al. | |
| 7,751,286 B2 | 7/2010 | Ogata et al. | |
| 7,852,733 B2 | 12/2010 | Ogata | |
| 7,924,676 B2 | 4/2011 | Ogata et al. | |
| 7,937,983 B2 | 5/2011 | Yoshimura et al. | |
| 8,045,043 B2 | 10/2011 | Kawakami et al. | |
| 8,248,524 B2* | 8/2012 | Chen | 348/374 |
| 8,259,401 B2* | 9/2012 | Schmieder et al. | 359/819 |
| 8,542,451 B2* | 9/2013 | Lu et al. | 359/819 |
| 2003/0214898 A1 | 11/2003 | Ogata et al. | |
| 2005/0116138 A1 | 6/2005 | Hanada et al. | |
| 2005/0201248 A1 | 9/2005 | Kitabayashi et al. | |
| 2007/0103737 A1 | 5/2007 | Nakajima | |

(Continued)

FOREIGN PATENT DOCUMENTS

| | | |
|---|---|---|
| JP | 2005-101711 A | 4/2005 |
| JP | 2005-217500 A | 8/2005 |

*Primary Examiner* — Timothy J Henn
*Assistant Examiner* — Pritham Prabhakher
(74) *Attorney, Agent, or Firm* — Dickstein Shapiro LLP

(57) ABSTRACT

An imaging device includes a welded part on a lens barrel side that is hardened after a contact portion of a lens barrel or a contact part on the lens barrel side is softened, where the contact portion of the lens barrel and the contact part on the lens barrel side are fixed, and a welded part on a light-receiving circuit side that is hardened after a contact portion of the light-receiving circuit or a contact part on a light-receiving circuit side is softened, where the contact portion of the light-receiving circuit and the contact part on the light-receiving circuit side are fixed.

2 Claims, 22 Drawing Sheets

(56) References Cited

U.S. PATENT DOCUMENTS

| | | |
|---|---|---|
| 2007/0104072 A1 | 5/2007 | Ogata |
| 2008/0068692 A1 | 3/2008 | Yoshimura |
| 2008/0117486 A1 | 5/2008 | Andoh et al. |
| 2009/0147643 A1 | 6/2009 | Ogata |
| 2010/0067080 A1 | 3/2010 | Shimizu et al. |
| 2010/0135143 A1 | 6/2010 | Ogata |
| 2010/0254027 A1* | 10/2010 | Genda ............ 359/738 |
| 2010/0259616 A1 | 10/2010 | Nakajima et al. |
| 2011/0199485 A1* | 8/2011 | Nakamura ............ 348/148 |
| 2011/0216195 A1 | 9/2011 | Tanaka et al. |
| 2012/0019940 A1* | 1/2012 | Lu et al. ............ 359/819 |
| 2012/0092543 A1* | 4/2012 | Afshari et al. ............ 348/335 |

* cited by examiner

IMAGING DEVICE

CROSS-REFERENCE TO RELATED APPLICATIONS

The present application is based on and claims priority from Japanese patent application number 2010-261931, filed Nov. 25, 2010, the disclosure of which is hereby incorporated by reference herein in its entirety.

BACKGROUND

The present invention relates to an imaging device that is used for, for example, a digital camera, a digital video camera, a device that obtains an image (image data) such as an image-reading device, and the like. In particular, the present invention relates to an imaging device that is suitable for an in-vehicle camera.

Conventionally, an imaging device having an optical element such as a lens for imaging, or the like, and an image sensor such as a CCD (Charge-Coupled Device), a CMOS (Complementary Metal Oxide Semiconductor), or the like, is widely applied to a digital camera, a digital video camera, an in-vehicle camera, or the like. Generally, the imaging device is positioned in a state such that an image-forming position of the optical element (lens) is on the image sensor (light-receiving surface), and is housed in a case.

Regarding such a positioning and fixing method, Japanese Patent Application Publication number 2005-101711 proposes an imaging device in which a screw thread provided on an outer circumference of a lens holder that holds a lens screws a screw groove provided on an inner circumferential surface of a frame (referred to as a lens barrel 4 in Japanese Patent Application Publication number 2005-101711) joined to a substrate having an image sensor. In such a conventional imaging device, an interval between the lens and the image sensor in the direction of an optical axis is adjusted by rotating the lens holder and the frame relatively. And by welding the lens holder and the frame in a state whereby positioning and fixing (focus adjustment) of the lens and the image sensor is performed, the lens holder and the frame are positioned and fixed more firmly. Therefore, it is possible to obtain a more stable optical performance.

Additionally, in Japanese Patent Application Publication number 2005-217500, an imaging device has been proposed in which a cylindrical lens is fitted in a v-shaped groove provided on a mounting base and fixed, and a package of a solid-state image sensor is pressed to each end of three convex parts of a cylindrical member provided in a concave part of the mounting base, each end and a contact portion of the package are melted and adjustment of the solid-state image sensor with respect to the lens is performed, the melted portions are solidified in a state where positioning is performed, and thereby the mounting base and the solid-state image sensor are positioned and fixed more firmly. In such an imaging device, in addition to an interval in the direction of the optical axis, a positional relationship in a direction perpendicular to the optical axis, a relative inclination of a lens with respect to the direction of the optical axis, or the like, can be adjusted. Therefore, a higher adjustment accuracy can be obtained, and a more stable optical performance can be obtained.

SUMMARY

In the imaging device disclosed in Japanese Patent Application Publication number 2005-101711, a lens holder that holds a lens and a frame that is joined to a substrate are welded and fixed, and therefore, due to the welding, there may be a possibility of the positional relationship between the lens and an image sensor changing in terms of positioning and fixing.

Also in the imaging device disclosed in Japanese Patent Application Publication number 2005-217500, a cylindrical member fixed in a concave part of a mounting base where a lens is fixed, and a solid-state image sensor (its package) are melted and fixed, and therefore, due to the melting, there may be a possibility of the positional relationship between the lens and the solid-state image sensor changing in terms of positioning and fixing.

Accordingly, in the above imaging devices, there may be a possibility of not obtaining a suitable optical performance, because the positional relationship between the lens and the solid-state image sensor is such that they are positioned and fixed in a state where the adjustment accuracy is low.

An object of the present invention is to provide an imaging device in which a lens and an image sensor are capable of being optically positioned and fixed with a higher adjustment accuracy.

In order to achieve the above object, the embodiment of the present invention provides: an imaging device comprising: a lens barrel that holds at least one optical element; a light-receiving circuit that at least has an image sensor that obtains an image of a photographic subject formed by the optical element, and a drive substrate that drives the image sensor; and a welding structure in which the lens barrel and the optical element are joined by welding, in a state where a positional relationship between the image sensor and the optical element optically positioned is maintained, wherein the welding structure has an intermediate holder where a contact part on a lens barrel side that comes into contact with a contact portion of the lens barrel and a contact part on a light-receiving circuit side that comes into contact with a contact portion of the light-receiving circuit are provided; a welded part on the lens barrel side that is hardened after the contact portion of the lens barrel or the contact part on the lens barrel side is softened, where the contact portion of the lens barrel and the contact part on the lens barrel side are fixed; and a welded part on the light-receiving circuit side that is hardened after the contact portion of the light-receiving circuit or the contact part on the light-receiving circuit side is softened, where the contact portion of the light-receiving circuit and the contact part on the light-receiving circuit side are fixed.

In order to achieve the above object, the embodiment of the present invention provides: a positioning and fixing method for a lens barrel and a light-receiving circuit of an imaging device, the imaging device including: the lens barrel that holds at least one optical element; and the light-receiving circuit that at least has an image sensor that obtains an image of a photographic subject formed by the optical element and a drive substrate that drives the image sensor, the method comprising: a first process of fixing relatively the lens barrel and the light-receiving circuit in a state where the optical element and an image sensor are optically positioned; a second process of providing an intermediate holder to be bridged between the lens barrel and the light-receiving circuit by contacting a contact part on a lens barrel side of the intermediate holder that fixes the lens barrel and the light-receiving circuit on a contact portion of the lens barrel, and contacting a contact part on a light-receiving circuit side of the intermediate holder on a contact portion of the light-receiving circuit; a third process of softening the contact portion of the lens barrel or the contact part on the lens barrel side, and at the same time softening the contact portion of the light-receiving circuit or the contact part on the light-receiving circuit side, and pressing the intermediate holder to the lens barrel and the light-receiving circuit, in a state where a relative positional relationship between the lens barrel and the light-receiving circuit is maintained; and a fourth process of forming a welded part on the lens barrel side by hardening the contact portion of the lens barrel or the contact part on the lens barrel side that is softened, and at the same time forming a welded part on the light-receiving circuit side by hardening the contact portion of the light-receiving circuit or the contact part on the light-receiving circuit side that is softened, in a state where the relative positional relationship between the lens barrel and the light-receiving circuit is maintained.

DETAILED DESCRIPTION OF THE PREFERRED EMBODIMENTS

Hereinafter, an imaging device according to each embodiment of the present invention will be explained with reference to the drawings.

Embodiment 1

An imaging device 10 according to Embodiment 1 of the present invention will be explained by use of FIGS. 1 to 21.

Figure 1:
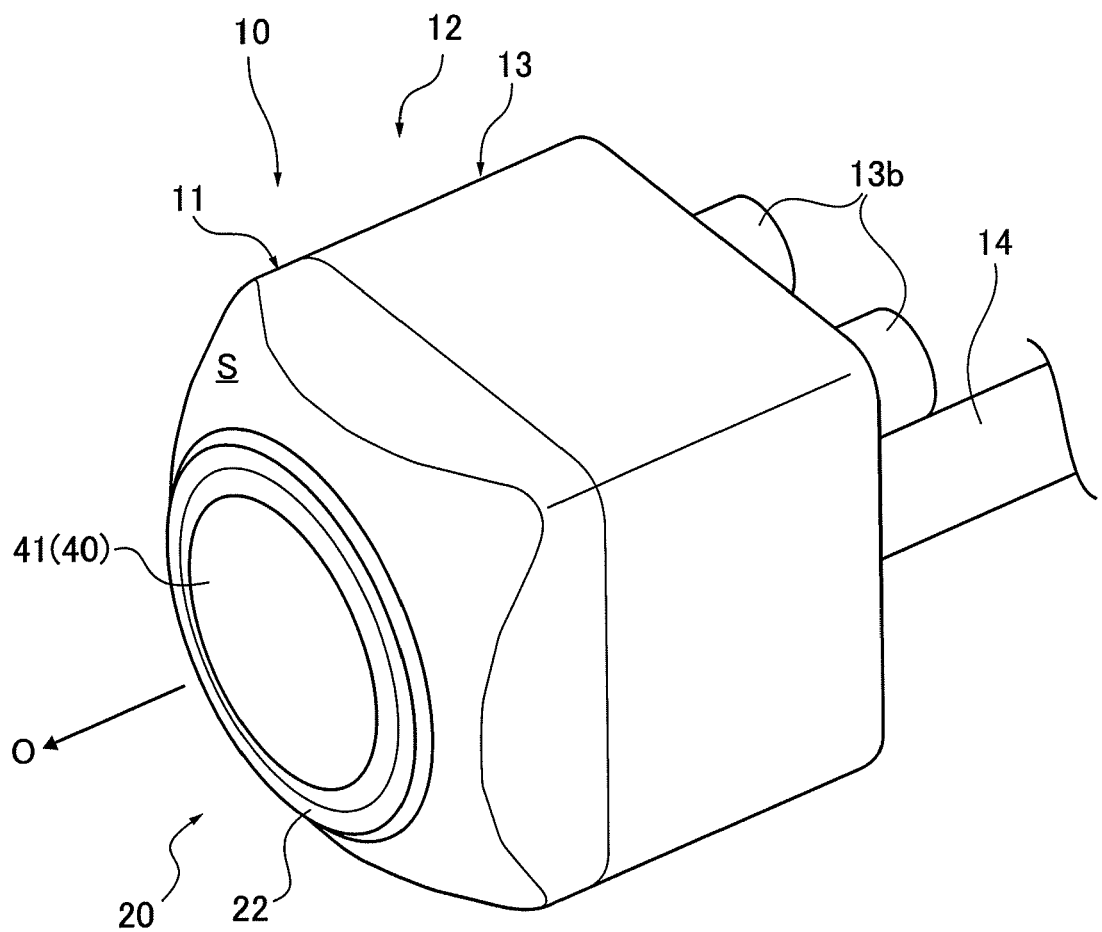
FIG. 1 is a perspective view of an imaging device 10 according to Embodiment 1 of the present invention.
Figure 2:
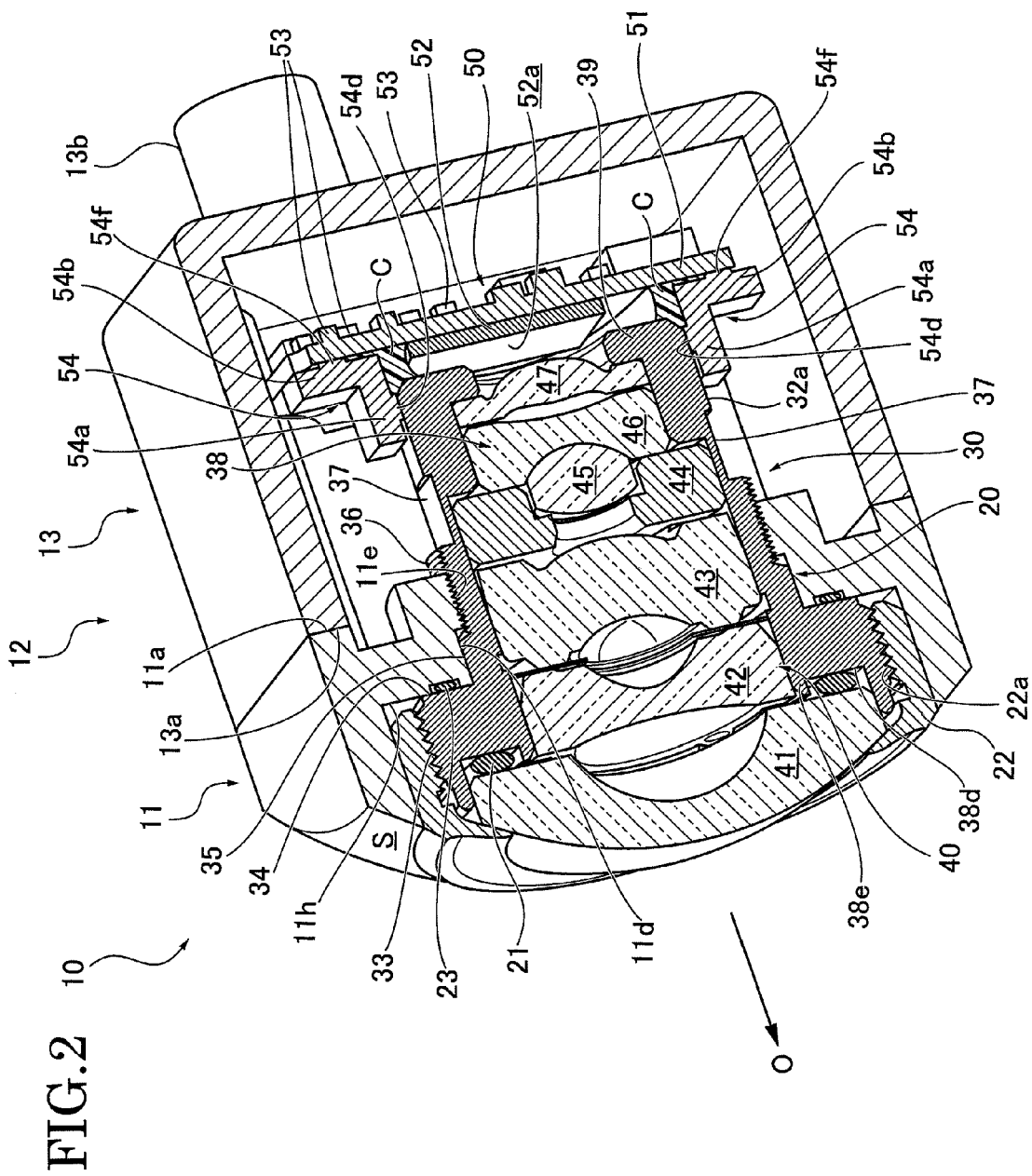
FIG. 2 is a cross-sectional perspective view along a plane including an optical axis O of the imaging device 10 of FIG. 1.

In the imaging device 10, as illustrated in FIGS. 1 and 2, an imaging optical system 20 (in FIG. 1, only an objective lens (lens 41) and a front end of a stopper 22 are shown) and a light-receiving circuit 50 are mounted to a mounting wall 11.

The mounting wall 11 forms an outer surface S that encircles at least the objective lens (lens 41) of the imaging optical system 20, that is, a first end part of a lens barrel 30 in the direction of an optical axis O, and is capable of mounting the imaging device 10 to a desired portion. In Embodiment 1, the mounting wall 11 has a rectangular shape that is a front shape seen in the direction of the optical axis O, and has an entirely rectangular parallelepiped shape, and constitutes a front side (photographic subject side) part (a front case) of a case 12. The mounting wall 11 is capable of being mounted to a rear case part 13 constituting a rear side of the case 12. A rear end surface 11a of the mounting wall 11 comes into contact with a front end surface 13a of the rear case part 13, in a state where a sealing member (for example, an O-ring, a flat seal, or the like) is in-between, which is not illustrated, and the mounting wall 11 and the rear case part 13 are joined by screw-threading or the like. Therefore, the case 12 having a waterproofing function and a dustproofing function (hereinafter, sealing function) in a joint (contact) portion is formed. The length of the mounting wall 11 in the direction of the optical axis O is set by a positional relationship between the mounting wall 11 and a smaller diameter part 32 (see FIG. 4, etc.) of the lens barrel 30 as described later.

Figure 3:
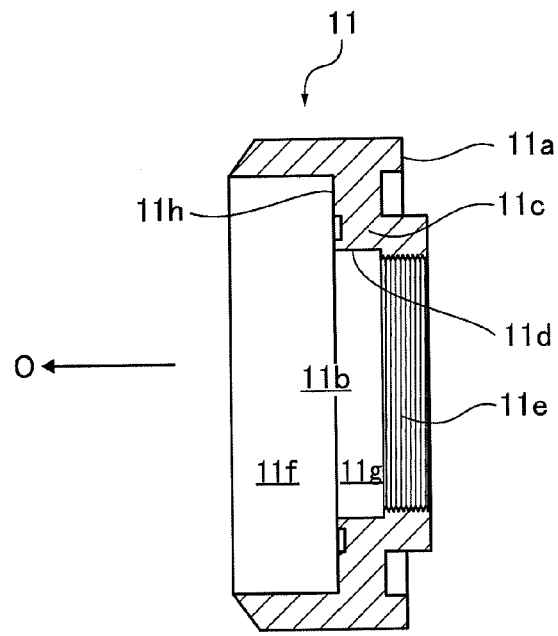
FIG. 3 is a cross-sectional view along the plane including the optical axis O of a mounting wall 11.

The mounting wall 11, as illustrated in FIG. 3, has a cylindrical-shape insert hole 11b through which the later-described lens barrel 30 of the imaging optical system 20 is capable of being inserted. On a rear side of the insert hole 11b (side of rear case part 13), an inward projection part 11c is provided. The inward projection part 11c is formed into a ring shape inwardly projecting from an inner circumferential wall surface of the mounting wall 11, and a rear end part of that extends to the rear side (side of rear case part 13).

In the inward projection part 11c, an inner surface of a front side (photographic subject side) thereof is taken as a positioning surface 11d that is a smooth circumferential surface. The positioning surface 11d has an inner diameter size that is capable of fitting a positioning part 35 (see FIG. 5, etc.) of the lens barrel 30. And in the inward projection part 11c, an inner surface of the rear side (side of the rear case part 13) that is next to the positioning surface 11d has a smaller inner diameter size than that of the positioning surface 11d, and has a thread groove 11e encircling the optical axis O. The thread groove 11e is capable of screwing a screw thread 36 (see FIG. 5, etc.) of the lens barrel 30. In the insert hole 11b, the inward projection part 11c is provided, so that the front side (photographic subject side) is taken as a larger hole part 11f that has a relatively larger diameter size (diameter size centering on the optical axis O), and the rear side (side of the rear case part 13) is taken as a smaller hole part 11g that has a smaller diameter than that of the larger hole part 11f. That is, the insert hole 11b forms a stepped through-hole that has two concentric ring shapes having different diameters seen from the front side (photographic subject side). The insert hole 11b forms a positioning in a radial direction part by the positioning surface 11d, and forms a positioning in the direction of the optical axis O part in cooperation with a front side surface 11h and the thread groove 11e of the inward projection part 11c. The front side surface 11h is an orthogonal plane perpendicular to the optical axis O.

The rear case part 13, as illustrated in FIGS. 1 and 2, has a box shape that is open at one end, and forms the case 12 that houses the imaging optical system 20 and the light-receiving circuit 50 (image sensor 52) in cooperation with the mounting wall 11. Behind a rear end surface 11a of the mounting wall 11, the rear case part 13 has a size (depth) that is capable of housing the imaging optical system 20 and the light-receiving circuit 50 joined to the lens barrel 30. As later described, the length of the mounting wall 11 in the direction of the optical axis O is limited by the positional relationship of the smaller diameter part 32 of the lens barrel 30.

On the rear end side of the rear case part 13, as illustrated in FIG. 1, two mounting projections 13b for mounting the case 12 including the imaging device 10 to a desired position are provided. In Embodiment 1, the mounting projections 13b are a boss part in which a screw hole, that is not illustrated, is provided. And in the rear case part 13, an electric wire (wire harness) 14 for supplying electric power to the light-receiving circuit 50 (later-described electronic component 53) and transmitting image data obtained by the image sensor 52 mounted on the light-receiving circuit 50 is provided. The electric wire 14 is connected to the light-receiving circuit 50 in a state of having a sealing function against the outside. As constitutions having a sealing function, there are a constitution where a connection hole (not illustrated) is provided in the rear case part 13 and the electric wire 14 is inserted into the connection hole and an adhesive agent for waterproofing is filled in the vicinity, and a constitution where the electric wire 14 (its coating member) is integrally formed with the rear case part 13. The electric wire 14 is directly connected to the light-receiving circuit 50 in a case where the rear case part 13 is not mounted to the mounting wall 11. The imaging optical system 20 is mounted to the mounting wall 11 that is capable of connecting to the rear case part 13.

Figure 4:
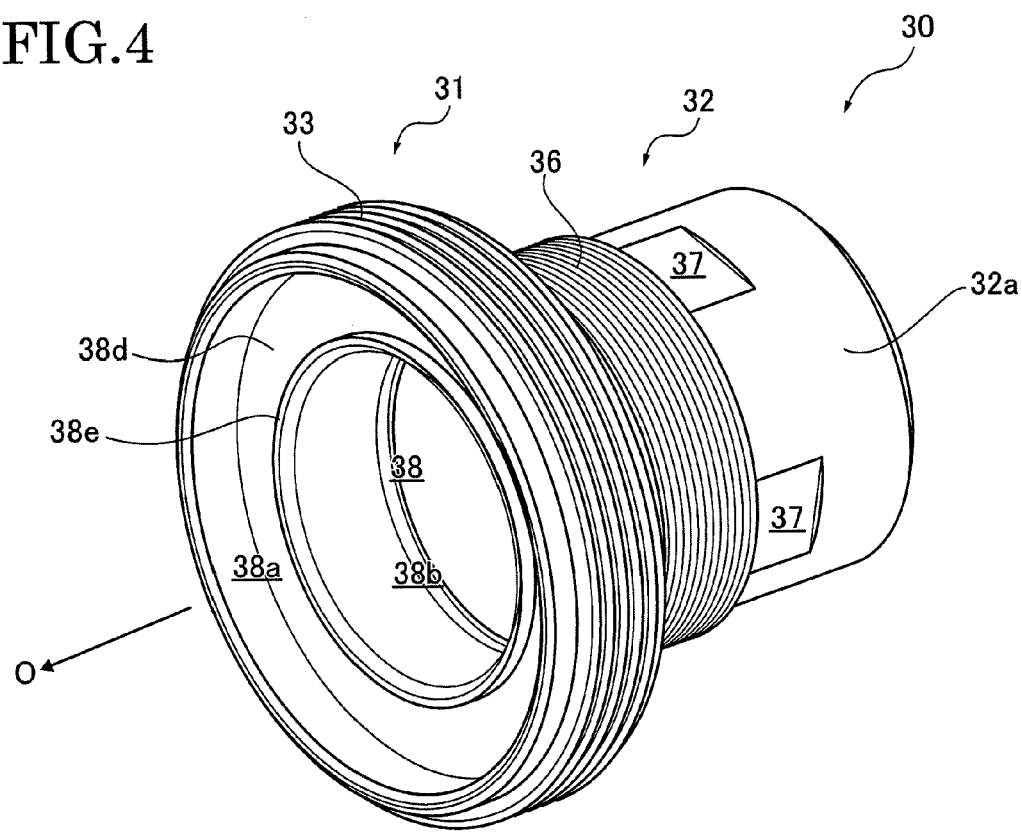
FIG. 4 is a perspective view of a lens barrel 30.
Figure 5:
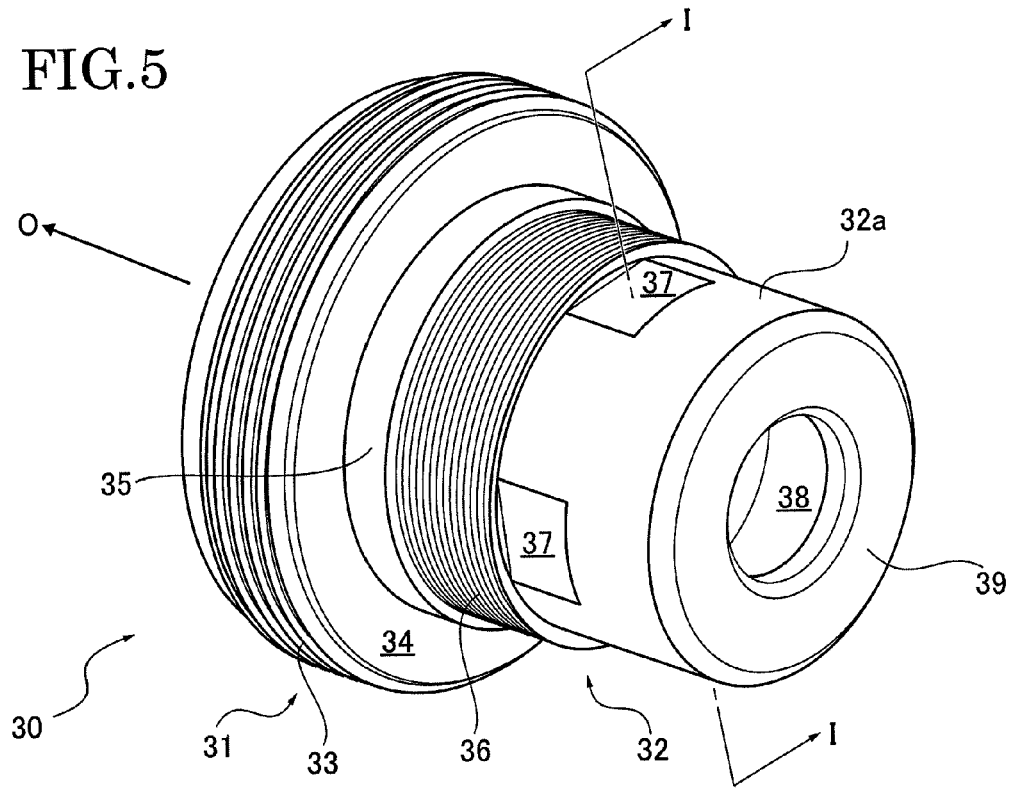
FIG. 5 is a perspective view of the lens barrel 30 seen from a rear end side (side of inner edge projection 39).
Figure 6:
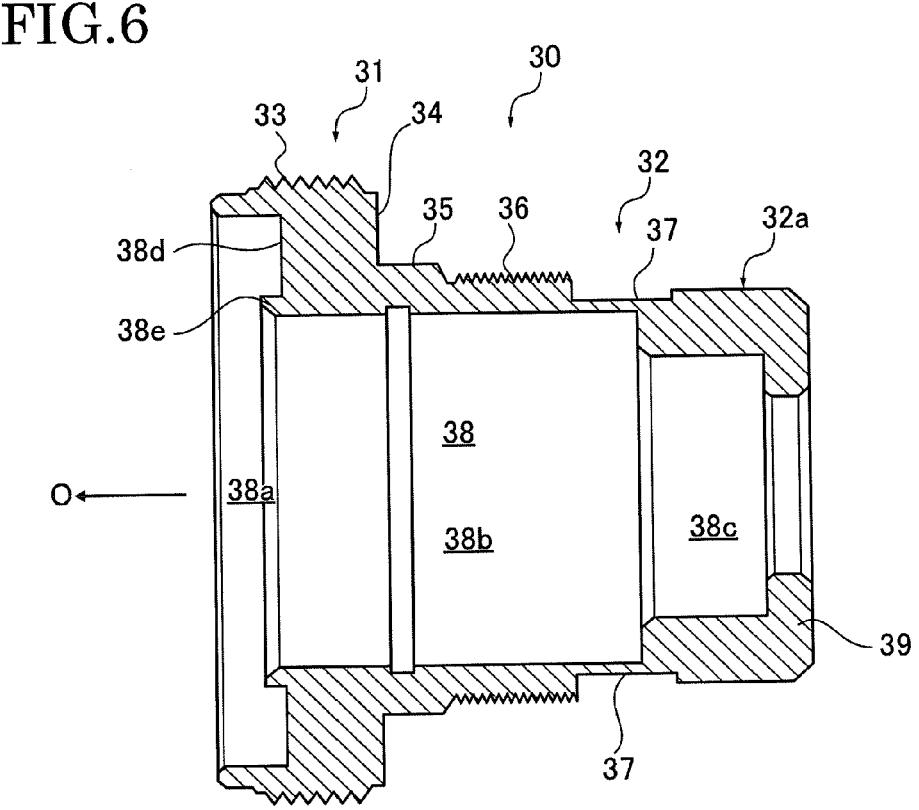
FIG. 6 is a cross-sectional view of FIG. 5 along an I-I line.
Figure 7:
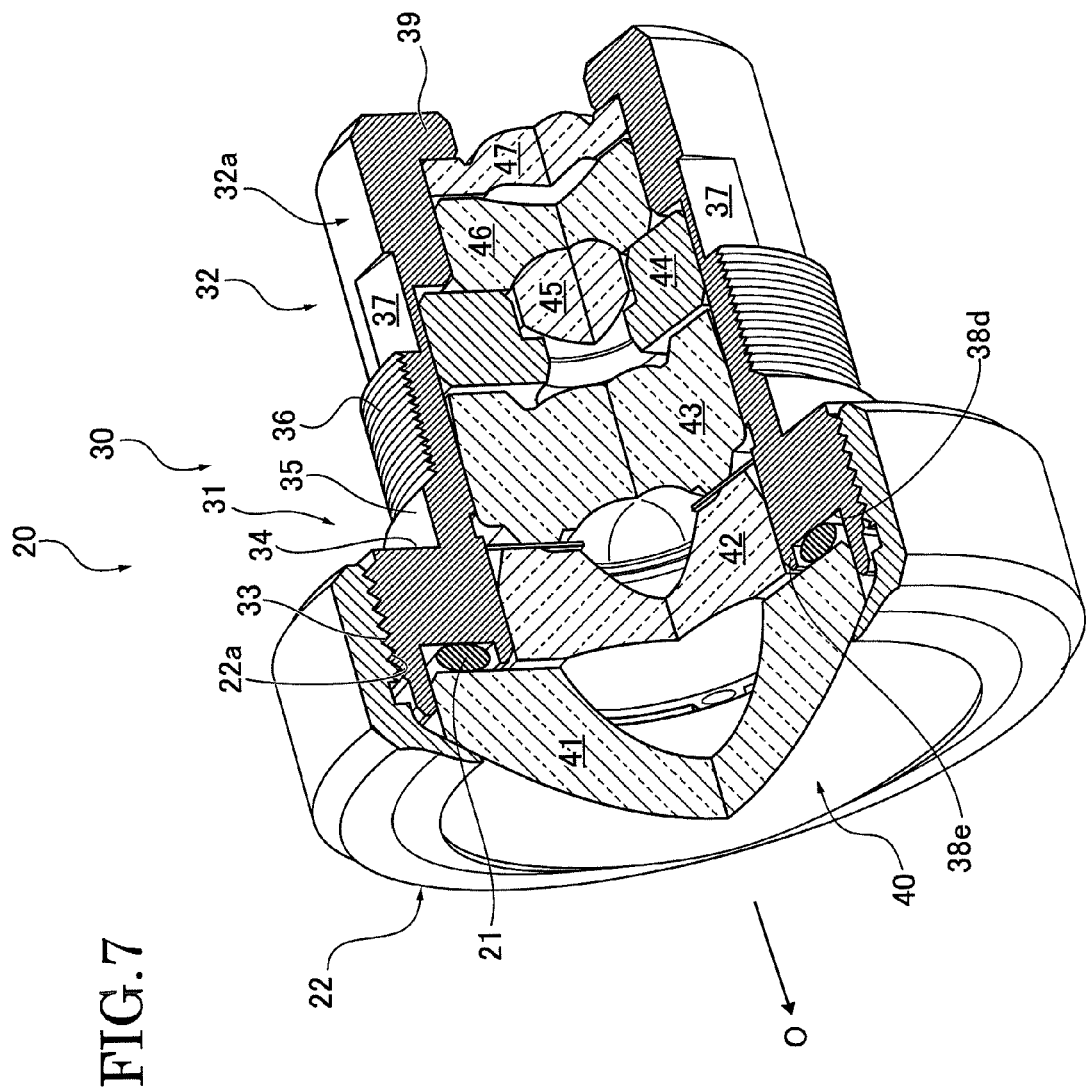
FIG. 7 is a half-sectional perspective view of an imaging optical system 20.

In the imaging optical system 20, as illustrated in FIG. 7, an optical element group 40 is held in the lens barrel 30. The lens barrel 30 has a cylindrical shape to hold the optical element group 40 inside, and as illustrated in FIGS. 4 to 6, in an external shape, a first end side that is the front side (photographic subject side) is a larger diameter part 31 that has a relatively larger diameter size (outer diameter size centering on the optical axis O in the radial direction), and a second end side that is the rear side is a smaller diameter part 32 that has a smaller diameter than that of the larger diameter part 31. An outer diameter of the larger diameter part 31 has a size that is capable of being inserted to the larger hole part 11f of the insert hole 11b of the mounting wall 11 and is not capable of being inserted to the smaller hole part 11g of the insert hole 11b. And an outer diameter of the smaller diameter part 32 has a size that is capable of being inserted to the smaller hole part 11g of the insert hole 11b of the mounting wall 11.

The lens barrel 30 includes a screw thread 33 on an outer circumferential surface of the larger diameter part 31, an orthogonal surface 34 perpendicular to the optical axis O that is formed by a difference in size of the outer diameters between the larger diameter part 31 and the smaller diameter part 32, the positioning part 35 that is provided next to the orthogonal surface 34 on the outer circumferential surface of the smaller diameter part 32, the screw thread 36 that is provided next to the positioning part 35 on the outer circumferential surface of the smaller diameter part 32, and a plurality of flat surface parts 37 that is respectively provided at intervals on the outer circumferential surface of the smaller diameter part 32 around the optical axis O.

The screw thread 33 is capable of screwing a screw groove 22a (see FIG. 7, etc.) provided in a stopper 22. The orthogonal surface 34 comes into contact with the front side surface 11h of the insert hole 11b, when the larger diameter part 31 of the lens barrel 30 is positioned in the larger hole part 11f of the insert hole 11b of the mounting wall 11.

The positioning part 35 has a surface shape (see FIG. 2, etc) that is capable of coming into contact with the positioning surface 11d of the smaller hole part 11g (inward projection part 11c), when the smaller diameter part 32 of the lens barrel 30 is positioned in the smaller hole part 11g of the insert hole 11b of the mounting wall 11. That is, positioning of the lens barrel 30 in the radial direction is performed by coming into contact with the positioning part 35 and the positioning surface 11d. Therefore, the positioning part 35 and the positioning surface 11d function as the positioning in the radial direction part that performs positioning of the lens barrel 30 (imaging optical system 20) in the radial direction with respect to the mounting wall 11. In particular, in Embodiment 1, the positioning part 35 and the positioning surface 11d come into contact with each other on a curved surface that extends in the direction of the optical axis O centering on the optical axis O, therefore it is possible to correspond a central axis in the mounting wall 11 (insert hole 11b) to a central axis in the lens barrel 30 (holder hole 38) by the positioning in the radial direction part.

The screw thread 36 is capable of screwing the screw groove 11e in the inward projection part 11c of the mounting wall 11. Therefore, the lens barrel 30 is mounted to the mounting wall 11, by positioning the smaller diameter part 32 in the smaller hole part 11g of the insert hole 11b of the mounting wall 11 and screwing the screw thread 36 on the screw groove 11e of the smaller hole part 11g (inward projection part 11c), in a state of being positioned in the radial direction by the positioning in the radial direction part. At this time, if the lens barrel 30 is rotated, due to an action of the screw groove 11e and the screw thread 36, the lens barrel 30 moves to a rear side (second end side on which the light-receiving circuit 50 is mounted) with respect to the mounting wall 11, and the orthogonal surface 34 of the lens barrel 30 and the front side surface 11h of the insert hole 11b of the mounting wall 11 are press-contacted with each other. Therefore, a relative positioning of the lens barrel 30 and the mounting wall 11 in the direction of the optical axis O is performed, and the lens barrel 30 and the mounting wall 11 are fixed. That is, the orthogonal surface 34 of the lens barrel 30 and the front side surface 11h of the insert hole 11b of the mounting wall 11 function as the positioning in the direction of the optical axis O part that performs positioning of the lens barrel 30 (imaging optical system 20) in the direction of the optical axis O with respect to the mounting wall 11. And in cooperation with the positioning surface 11d of the above positioning in the radial direction part, the screw groove 11e of the insert hole 11b of the mounting wall 11 functions as a screw-fixing part that presses the first end part (in this example, orthogonal surface 34) of the lens barrel 30 to the mounting wall 11 (in this example, front side surface 11h) in the direction of the optical axis O and fixes the lens barrel 30 to the mounting wall 11.

The flat surface part 37 is provided on an outer circumferential surface of the smaller diameter part 32 and next to the screw thread 36 in the direction of the optical axis O, and extends in a predetermined length in the direction of the optical axis O. Additionally, between the flat surface part 37 and the rear end (second end) part of the lens barrel 30, a predetermined interval is provided. The predetermined length, in a case of fixing the lens barrel 30 to the mounting wall 11 as described above, is set to a length which makes holding the lens barrel 30 easy when the lens barrel 30 is rotated. Therefore, the flat surface part 37 functions as a holder capable of holding the lens barrel 30, in a case of inserting the lens barrel 30 in the insert hole 11b of the mounting wall 30 from a side of an inner edge projection 39 (second end side) and adjusting a screwing amount of the thread groove 11e of the smaller hole part 11g (inward projection part 11c) of the insert hole 11b and the screw thread 36 of the smaller diameter part 32 of the lens barrel 30. And the predetermined interval between the flat surface part 37 and the rear end part of the lens barrel 30 is an interval that makes it possible to ensure a length capable of fixing an intermediate holder 54 (contact part 54d on the lens barrel side of a wall part 54a on the lens barrel side (see FIG. 10)) by welding. Therefore, in the smaller diameter part 32, in the direction of the optical axis O, an outer circumferential surface part 32a positioned closer to the rear end side than the flat surface part 37 is a surface (contact portion of lens barrel) facing the wall part 54a on a lens barrel side of the intermediate holder 54. In the present embodiment, four flat surface parts 37 are provided respectively at four portions at equal intervals in the circumferential direction of the smaller diameter part 32, and this makes it easy to hold the lens barrel 30 from the radial direction (direction perpendicular to the optical axis O).

In the lens barrel 30, in order to hold the optical element group 40, a holding hole 38 that passes through along the direction of the optical axis O is provided. The holding hole 38 has a large inner diameter part 38a, a medium inner diameter part 38b, and a small inner diameter part 38c. The large inner diameter part 38a is capable of fitting the lens 41 as the optical element group 40 on a front side (photographic subject side). The medium inner diameter part 38b is positioned next to the large inner diameter part 38a and has a smaller inner diameter than that of the large inner diameter part 38a. The small inner diameter part 38c is positioned next to the medium inner diameter part 38b and has a smaller inner diameter than that of the medium inner diameter part 38b. In the large inner diameter part 38a, a face (orthogonal face) 38d perpendicular to the optical axis O is provided on a side of the medium inner diameter 38b. In the orthogonal face 38d, in order to hold a rear surface of the lens 41, a circular projection part 38e that is circularly formed and has an inner diameter size continuous with the medium inner diameter part 38b is provided. On a rear side of the small inner diameter part 38c (side of the image sensor 52), that is, the rear end (second end) part of the lens barrel 30, the inner edge projection part 39 is provided to prevent a lens 47 of the image optical element group 40 that is fitted from falling off. The optical element group 40 is housed in the holding hole 38 of the lens barrel 30.

Figure 8:
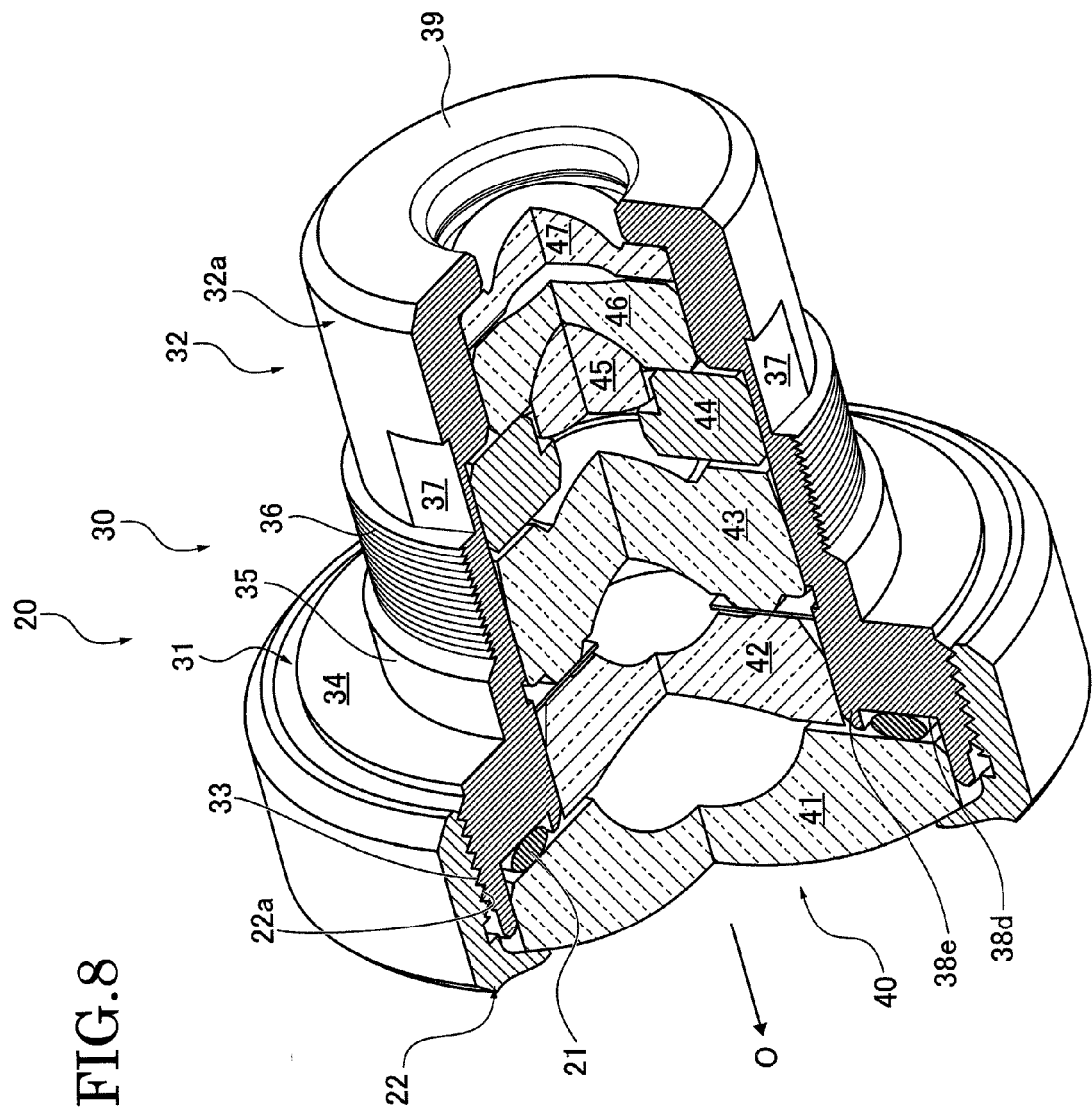
FIG. 8 is a half-sectional perspective view of the imaging optical system 20 seen from the rear end side (side of inner edge projection 39).

The optical element group 40 forms an image of a photographic subject in an arbitrary position to obtain the image of the photographic subject. The optical element group 40 has at least one optical element, and is appropriately structured depending on desired optical performance with regard to the imaging device 10 (imaging optical system 20). In the present embodiment, as illustrated in FIGS. 7 and 8, the optical element group 40 has the lens 41, a lens 42, a lens 43, an aperture 44, a lens 45, a lens 46, and the lens 47 in order from a photographic subject (object) side. The lens 41 has an outer diameter size capable of fitting in the large inner diameter part 38a of the holding hole 38 of the lens barrel 30. Each of the lens 42, the lens 43, and the aperture 44 has an outer diameter size capable of fitting in the medium inner diameter part 38b of the holding hole 38 of the lens barrel 30. Each of the lens 46 and the lens 47 has an outer diameter size capable of fitting in the small inner diameter part 38c of the holding hole 38 of the lens barrel 30. The optical element group 40 is inserted in the holding hole 38 of the lens barrel 30, from an opening of the large inner diameter part 38a, in order of the lens 47, the lens 46, the lens 45, the aperture 44, the lens 43, the lens 42, and the lens 41. Here, in the present embodiment, in a case where the lens 41 is inserted in the holding hole 38 of the lens barrel 30 after the lens 42, the lens 41 is inserted in the holding hole 38 such that firstly an O ring 21 is arranged in a manner that encircles the circular projection part 38e on the orthogonal face 38d of the large inner diameter part 38a of the holding hole 38, and the O ring 21 and the circular projection part 38e come into contact with the rear surface of the lens 41, and the rear surface of the lens 41 faces the orthogonal face 38d.

The stopper 22 makes it possible to prevent the optical element group 40 inserted in the holding hole 38 from falling off from the opening of the large inner diameter part 38a. The stopper 22 has a cylindrical shape that has a size capable of encircling the outer circumferential surface of the larger diameter part 31 of the lens barrel 30, and a front end (end of the photographic subject side) of the stopper 22 has a diameter size capable of contacting a peripheral part (outside of an effective area) of a front surface of the lens 41 from the outside (front side). On a rear end side of an inner circumferential surface of the stopper 22, a thread groove 22a capable of screwing a screw thread 33 on the larger diameter part 31 of the lens barrel 30 is provided. The stopper 22 presses the lens 41 to the rear side of the lens barrel 30 (side of the image sensor 52) by screwing the thread groove 22a on the screw thread 33 so as to cover the larger diameter part 31, in a state where the optical element group 40 is appropriately inserted in the holding hole 38. Therefore, the optical element group 40 is pressed to a side of the inner edge projection part 39 in the holding hole 38 of the lens barrel 30, and the lens 47 is pressed to the inner edge projection part 39, and the optical element group 40 is positioned in the lens barrel 30 in the direction of the optical axis O. Accordingly, the optical element group 40 is aligned in an appropriate position in the lens barrel 30 on the optical axis O, and thereby the imaging optical system 20 with desired optical performance is obtained. At this time, the O ring 21 arranged between the rear surface of the lens 41 and the orthogonal face 38d of the larger inner diameter part 38b of the holding hole 38 is appropriately compressed. That is, the O ring 21 is pressed to contact the rear surface of the lens 41 and pressed to contact the orthogonal face 38d. Therefore, in the imaging optical system 20, the O ring 21 that is appropriately compressed prevents water, dust and so on from entering the lens barrel 30 (medium inner diameter part 38b and small inner diameter part 38c of the holding hole 38), and an efficient sealing function is provided. Thus, in the imaging optical system 20, the optical element group 40 is held in a sealed state by the lens barrel 30, and desired optical performance is provided. In the present embodiment, an axis of rotational symmetry (a center position in an image obtained by the image sensor 52) of each of the lenses 41 to 47 (including the aperture 44) that is a central axis position of the optical element group 40 (lens barrel 30) is taken as the optical axis O of the imaging optical system 20. The light-receiving circuit 50 is arranged in an image-forming position of the optical element group 40 of the imaging optical system 20.

Figure 9:
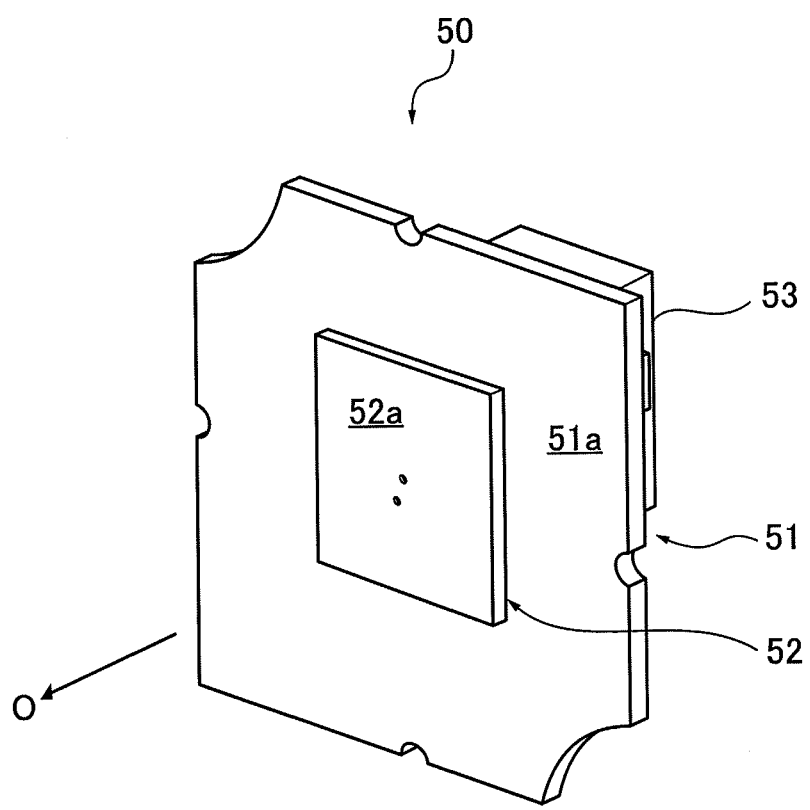
FIG. 9 is a perspective view of a light-receiving circuit 50.

The light-receiving circuit 50, as illustrated in FIG. 9, has the substrate 51 on which the image sensor 52 and the electronic component 53 are mounted. The image sensor 52 is a solid-state image sensor such as a CCD image sensor, a CMOS image sensor, or the like, and converts an image of a photographic subject formed on the light-receiving surface 52a via the imaging optical system 20 (optical element group 40) to an electric signal (image data) and outputs it. The electronic component 53 is mounted on the substrate 51, and performs control of an operation of the image sensor 52, generation of a digital image corresponding to the image of the photographic subject based on the electric signal outputted from the image sensor 52, and the like. That is, the substrate 51 functions as a drive substrate that drives and controls the image sensor 52. Thus, the light-receiving circuit 50 converts the image of the photographic subject obtained via the imaging optical system 20 to the electric signal and outputs it.

The light-receiving circuit 50 is joined to the lens barrel 30 by a welding structure (see FIG. 2). In the present embodiment, the welding structure is structured by the intermediate holder 54 welded to the light-receiving circuit 50 and the lens barrel 30 by an ultrasonic welding method (see FIGS. 2, 17, 18, etc.). In order to provide the image-forming position of the imaging optical system 20 (optical element group 40) on the light-receiving surface 52a of the image sensor 52, a position of the image sensor 52a (its light-receiving surface 52a) with respect to the optical element group 40 is in an optically positioned state (positional relationship), and the intermediate holder 54 structures the welding structure to join the lens barrel 30 to the image sensor 52 or the substrate 51 on which the image sensor 52 is mounted by welding.

Figure 10:
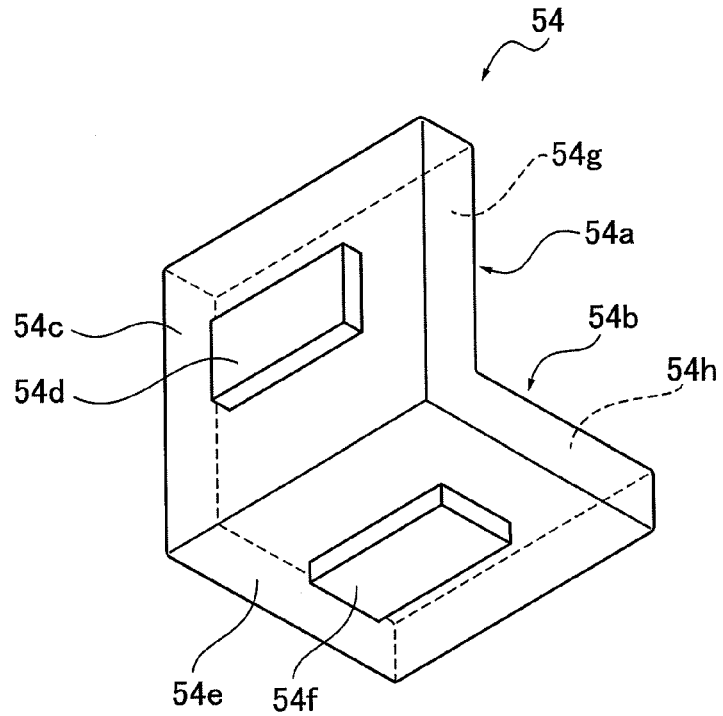
FIG. 10 is a perspective view of an intermediate holder 54.

The intermediate holder 54 is formed by a thermoplastic material. As illustrated in FIG. 10, the intermediate holder 54 is formed into an entirely L-letter shape by bending an elongated rectangular parallelepiped member, and has the wall part 54a on the lens barrel side and a wall part 54b on a substrate side. In the intermediate holder 54, the contact part 54d on the lens barrel side is provided on a mounting wall surface 54c of the wall part 54a on the lens barrel side, and a contact part 54f on a light-receiving circuit side is provided on a mounting wall surface 54e of the wall part 54b on the substrate side. The contact part 54d on the lens barrel side is formed into a convex shape that projects from the mounting wall surface 54c that is flat, and here, for example, it is formed into a rectangular parallelepiped shape. The contact part 54f on the light-receiving circuit side is formed into a convex shape that projects from the mounting wall surface 54e that is flat, and here, for example, it is formed into a rectangular parallelepiped shape. In the present embodiment, the contact part 54d on the lens barrel side and the contact part 54f on the light-receiving circuit side are integrally formed by the wall part 54a on the lens barrel side and the wall part 54b on the substrate side, respectively. In a case of the ultrasonic welding method, in the intermediate holder 54, the mounting wall surface 54c of the wall part 54a on the lens barrel side forms a facing surface on the lens barrel side that faces the outer circumferential surface part 32a of the smaller diameter part 32 of the lens barrel 30, and the contact part 54d on the lens barrel side (its end face) comes into contact with the outer circumferential surface part 32a. Additionally, in the intermediate holder 54, in a case of the ultrasonic welding method, the mounting wall surface 54e of the wall part 54b on the substrate side forms a facing surface on the light-receiving circuit side that faces a surface 51a of the substrate 51 of the light-receiving circuit 50 (surface on which the image sensor 52 is mounted), and the contact part 54f on the light-receiving circuit side (its end face) comes into contact with the surface 51a. Therefore, in the present embodiment, the outer circumferential surface part 32a of the smaller diameter part 32 of the lens barrel 30 functions as a contact portion of the lens barrel, and the surface 51a of the substrate 51 of the light-receiving circuit 50 (surface on which the image sensor 52 is mounted) functions as a contact portion of the light-receiving circuit.

Figure 11:
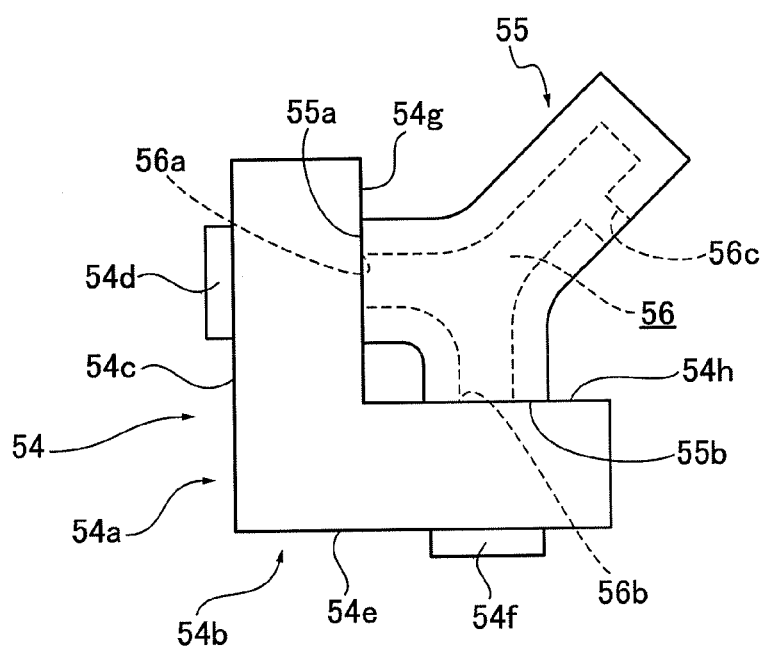
FIG. 11 is a side view illustrating a state where the intermediate holder 54 is sucked and held by a horn 55.

The intermediate holder 54, as illustrated in FIG. 11, is capable of being sucked and held by a horn 55. The horn 55 is a transmission member used for ultrasonic welding, which is later described. In the present embodiment, the horn 55 is in a long stick shape with bifurcated ends (55a, 55b). A first end face 55a of the horn 55 is capable of coming into contact with a wall surface 54g on a holder side of the wall part 54a on the lens barrel side of the intermediate holder 54, and a second end face 55b of the horn 55 is capable of coming into contact with a wall surface 54h on a holder side of the wall part 54a on the lens barrel side of the intermediate holder 54.

Additionally, inside the horn 55, a suction hole 56 that is a through-hole is provided. The suction hole 56 extends toward the first end face 55a, the second end face 55b, and a rear end, that is, the suction hole 56 is a through-hole that follows an external shape of the horn 55. The suction hole 56 forms an opening 56a that is open in the first end face 55a of the horn 55, and an opening 56b that is open in the second end face 55b of the horn 55. And in the suction hole 56, a suction opening 56c that is open in an outer circumferential surface on a rear end side in the vicinity of the rear end of the horn 55 is provided.

In the horn 55, in a state where the first end face 55a of the horn 55 comes into contact with the wall surface 54g on the holder side of the wall part 54a on the lens barrel side of the intermediate holder 54, and the second end face 55b of the horn 55 comes into contract with the wall surface 54h on the holder side of the wall part 54b on the light-receiving circuit side of the intermediate holder 54, the intermediate holder 54 is sucked and held by evacuating the air of the suction hole 56 (its space inside the suction hole 56) from the suction opening 56c by a vacuum suction mechanism (not illustrated). In the horn 55, since the first end face 55a of the horn 55 is capable of coming into contact with the wall surface 54g on the holder side of the wall part 54a on the lens barrel side of the intermediate holder 54, and the second end face 55b of the horn 55 is capable of coming into contact with the wall surface 54h on the holder side of the wall part 54b on the light-receiving circuit side of the intermediate holder 54, it is possible to press the intermediate holder 54.

Next, joining of the lens barrel 30 and the light-receiving circuit 50 (substrate 51) will be explained. In the imaging device 10 according to the present embodiment, in order to prevent a change of a relative positional relationship between the optical element group 40 and the image sensor 52 during a joining operation process, an ultrasonic welding method using the intermediate holder 54 is adopted for joining of the lens barrel 30 and the light-receiving circuit 50 (substrate 51).

In the ultrasonic welding method, the intermediate holder 54 is set to a size in accordance with the positional relationship between the lens barrel 30 (its contact portion of the lens barrel 30) and the light-receiving circuit 50 (its contact portion of the light-receiving circuit 50) that is positioned as later-described. The size is a size capable of contacting the wall part 54*a* on the lens barrel side on the contact portion of the lens barrel 30 (the outer circumferential surface part 32*a* of the smaller diameter part 32 in the present embodiment), and contacting the wall part 54*b* on the substrate side on the contact portion of the light-receiving circuit 50 (surface 51*a* (surface on which the image sensor 52 is mounted) of the substrate 51 in the present embodiment), in a state where the lens barrel 30 and the light-receiving circuit 50 are positioned and fixed. The contact part 54*d* on the lens barrel side and the contact part 54*f* on the light-receiving circuit side are hardened after being softened (melted) by ultrasonic waves, so that the height (thickness in a projection direction) of the contact part 54*d* on the lens barrel side and the contact part 54*f* on the light-receiving circuit side is reduced (see FIGS. 13 and 14) compared with before performing the ultrasonic welding; however, in FIGS. 13 and 14, the reduction in the height is empathically illustrated, and does not always correspond to a degree of the reduction in the height in a case of the actual ultrasonic welding.

Figure 12:
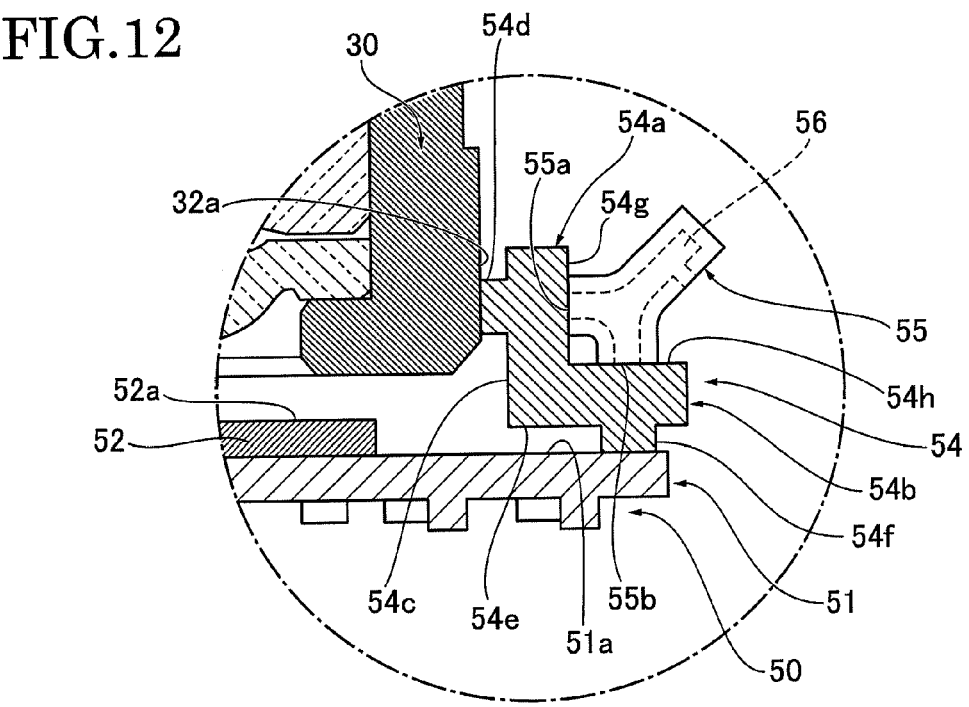
FIG. 12 is a cross-sectional view illustrating a state where the intermediate holder 54 comes into contact with a substrate 51 and the lens barrel 30 that are relatively fixed in an ultrasonic welding method.
Figure 13:
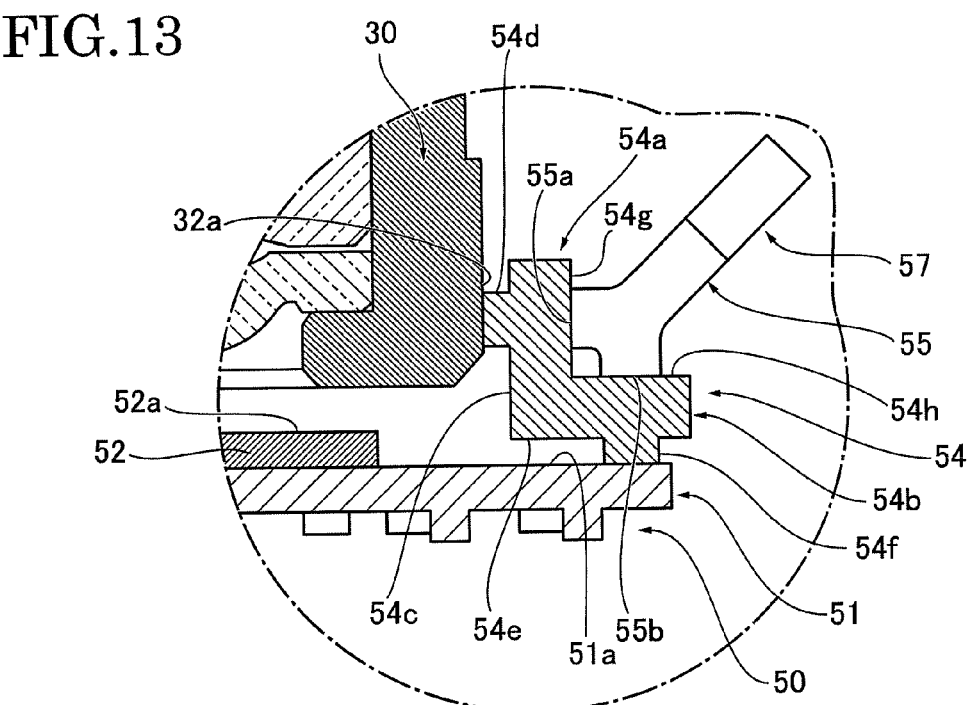
FIG. 13 is a cross-sectional view illustrating a state where ultrasonic vibration and a pressing force are applied in the ultrasonic welding method using the intermediate holder 54.

In the ultrasonic welding method, as illustrated in FIG. 12, with respect to the lens barrel 30 and the light-receiving circuit 50 (substrate 51) that are positioned and fixed, the intermediate holder 54 is arranged to be bridged between the lens barrel 30 and the light-receiving circuit 50 by contacting the contact part 54*d* (its end face) on the lens barrel side of the wall part 54*a* on the lens barrel side on the outer circumferential surface part 32*a* of the smaller diameter part 32 of the lens barrel 30 and contacting the contact part 54*f* (its end face) on the light-receiving circuit side of the wall part 54*b* on the substrate side on the surface 51*a* (surface on which the image sensor 52 is mounted) of the substrate 51. Then, as illustrated in FIG. 13, as the relative positional relationship between the lens barrel 30 and the light-receiving circuit 50 is maintained, a convertor 57 is contacted on the horn 55 contacted on the intermediate holder 54. The convertor 57 includes a piezoelectric element and the like, and converts an electric signal (for example, alternate current) outputted from a generator (not illustrated) to a mechanical ultrasonic vibration (vibrational energy). The horn 55 transmits the ultrasonic vibration (vibrational energy) of the convertor 57. By this method, the contact part 54*d* (its end face) on the lens barrel side that is a contact part with respect to the lens barrel 30 and the contact part 54*f* (its end face) on the light-receiving circuit side that is a contact part with respect to the light-receiving circuit 50 are softened (melted) at the same time (see FIG. 14) (third process). In this case, the contact part 54*d* (its end face) on the lens barrel side is pressure-welded on the outer circumferential surface part 32*a* of the lens barrel 30, and the contact part 54*f* (its end face) on the light-receiving circuit side is pressure-welded on the substrate 51 (its surface 51*a*) of the light-receiving circuit 50. The pressing direction is preferably a direction close to a center of each of the contact parts with respect to the lens barrel 30 and the light-receiving circuit 50 (substrate 51).

Figure 14:
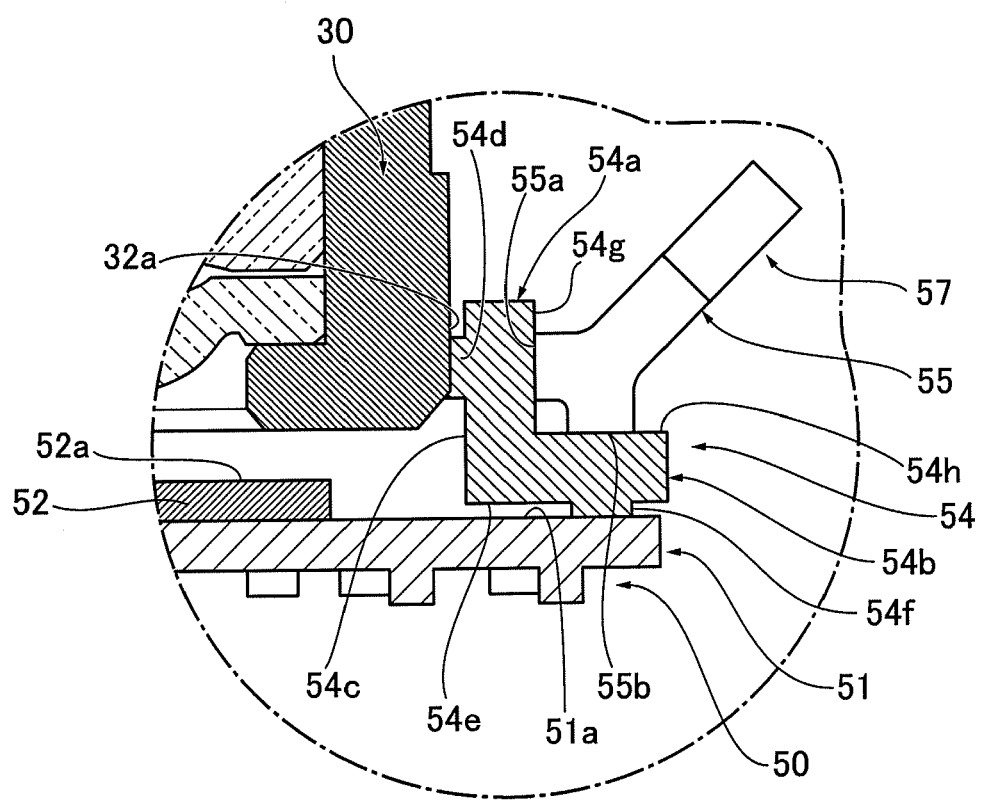
FIG. 14 is a cross-sectional view illustrating a state where the substrate 51 and the lens barrel 30 are positioned and fixed by the ultrasonic welding method using the intermediate holder 54.

Then, the supply of the ultrasonic vibration is stopped in a state where the horn 55 is press-contacted on the lens barrel 30 and the light-receiving circuit 50, the positional relationship between which is relatively maintained. And therefore, as illustrated in FIG. 14, a softened (melted) part in the contact part 54*d* (its end face) on the lens barrel side is hardened, and the contact part 54*d* (its end face) on the lens barrel side is fixed on the outer circumferential surface part 32*b* of the smaller diameter part 32 of the lens barrel 30, and a softened (melted) part in the contact part 54*f* (its end face) on the light-receiving circuit side is hardened, and the contact part 54*f* (its end face) on the light-receiving circuit side is fixed on the surface 51*a* (surface on which the image sensor 52 is mounted) of the substrate 51 of the light-receiving circuit 50 (fourth process). At this time, the ultrasonic vibration is applied on the contact part 54*d* (its end face) on the lens barrel side and the contact part 54*f* (its end face) on the light-receiving circuit side from the same horn 55 (convertor 57), and the supply of the ultrasonic vibration is stopped at the same time, therefore, hardening, that is, fixing on the outer circumferential surface part 32*a* and on the surface 51*a* is performed at the same time. The softened (melted) part in the contact part 54*d* on the lens barrel side functions as a welded part on the lens barrel side that fixes the contact part 54*d* on the lens barrel side and the outer circumferential surface part 32*a* of the smaller diameter part 32 of the lens barrel 30 that is the contact portion of the lens barrel 30. The softened (melted) part in the contact part 54*f* on the light-receiving circuit side functions as a welded part on the light-receiving circuit side that fixes the contact part 54*f* on the light-receiving circuit side and the surface 51*a* (surface on which the image sensor 52 is mounted) of the substrate 51 of the light-receiving circuit 50 that is the contact portion of the light-receiving circuit 50.

The ultrasonic welding method is a method such that, thus, by maintaining the positional relationship between the lens barrel 30 and the light-receiving circuit 50, and applying the ultrasonic vibration and the pressing force to the intermediate holder 54 that is bridged between the lens barrel 30 and the light-receiving circuit 50, the contact part 54*d* (its end face) on the lens barrel side and the contact part 54*f* (its end face) on the light-receiving circuit side are softened (melted) at the same time, and then the softened (melted) parts are hardened at the same time, and the lens barrel 30 and the light-receiving circuit 50 (substrate 51) are fixed by welding via the intermediate holder 54. In the ultrasonic welding method, after hardening the softened (melted) parts, if maintaining of the positional relationship between the lens barrel 30 and the light-receiving circuit 50 (substrate 51) is released, the positional relationship between the lens barrel 30 and the light-receiving circuit 50 is hardly changed. This is because, in the ultrasonic welding method, an influence of a shape change of the contact part 54*d* on the lens barrel side and the contact part 54*f* on the light-receiving circuit side, that is, the influence of the shape change of the intermediate holder 54 is absorbed by displacing (moving) the intermediate holder 54 in a direction (pressing direction) getting close to the lens barrel 30 and the light-receiving circuit 50 (substrate 51) that are relatively fixed. Additionally, in the ultrasonic welding method, it is possible to make the softened (melted) parts in the contact part 54*d* on the lens barrel side and the contact part 54*f* on the light-receiving circuit side (the welded part on the lens barrel side and the welded part on the light-receiving circuit side) extremely thin so as to follow contact surfaces, and therefore it is also possible to reduce the influence of the shape change due to softening (melting). Here, if "the same time" described above is a timing that is capable of absorbing the influence of the shape change of the intermediate holder 54 due to softening (melting) by displacing (moving) the intermediate holder 54 in the direction (pressing direction) getting close to the lens barrel 30 and the light-receiving circuit 50 (substrate 51) that are relatively fixed, in other words, a timing that is capable of equalizing a moving state of the intermediate holder 54 by pressing by the contact part 54*d* (its end face) on the lens barrel side and the contact part 54*f* (its end face) on the light-receiving circuit side that are in a softened (melted) state, a time difference in a strict sense is allowable. Therefore, in the present embodiment, the ultrasonic vibration is applied on the contact part 54*d* (its end face) on the lens barrel side and the contact part 54*f* (its end face) on the light-receiving circuit side from the same horn 55 (convertor 57); however, if it is possible to soften (melt) both at the same time and harden both at the same time, the ultrasonic vibration can be applied (stopped) individually, and it is not limited to the present embodiment.

Figure 15:
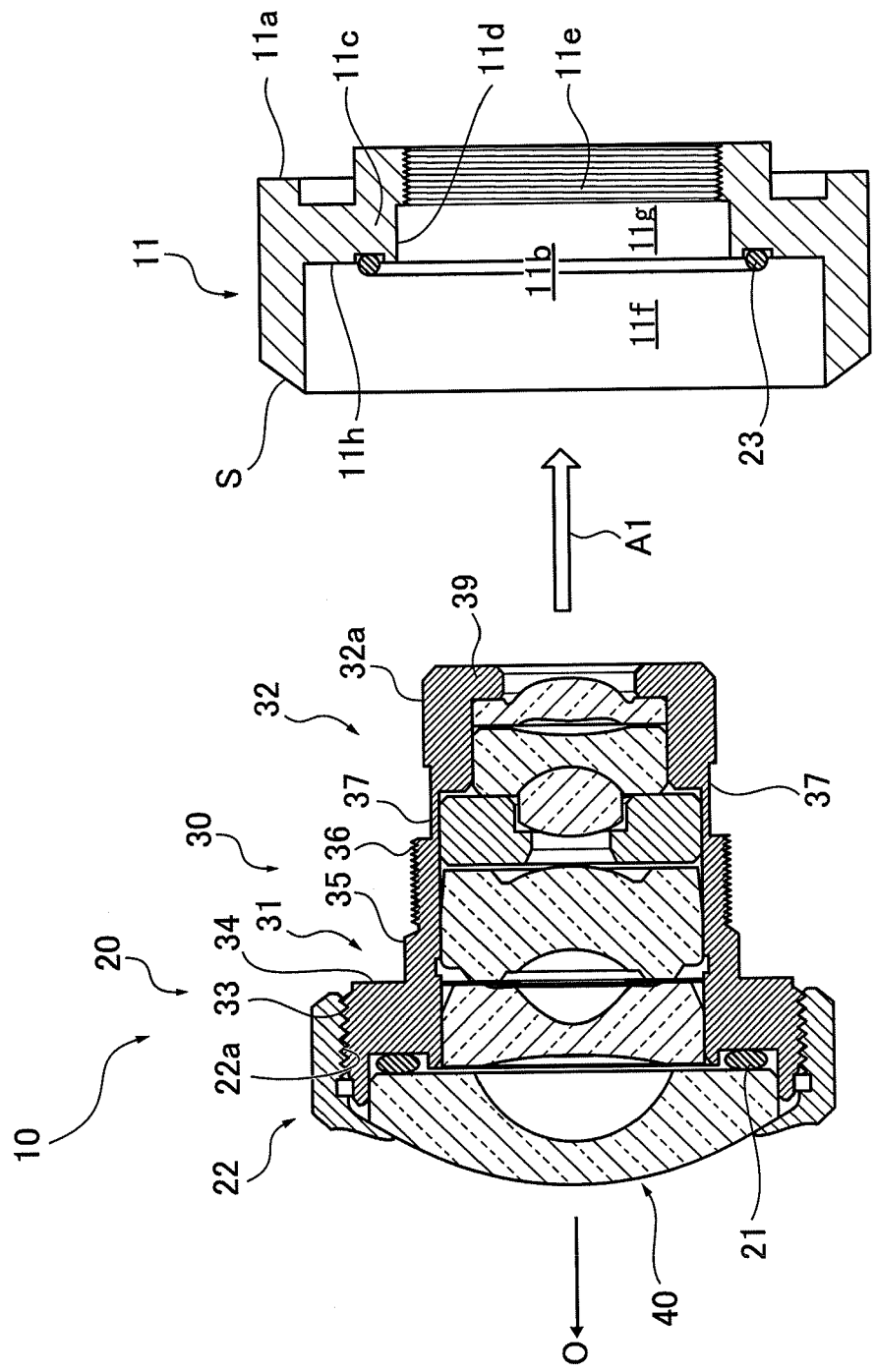
FIG. 15 is a cross-sectional view illustrating a state where the imaging optical system 20 is mounted to the mounting wall 11.

In the imaging device 10, before positioning and fixing of the light-receiving circuit 50 (image sensor 52 mounted on the substrate 51) with respect to the lens barrel 30, as illustrated in FIG. 15, the imaging optical system 20 (see FIGS. 7 and 8) assembled as described above and the mounting wall 11 are fixed. In this fixing, an O ring 23 as an example of a sealing member is arranged on the front side surface 11*h* of the mounting wall 11, and the side of the inner edge projection 39 (second end side) of the lens barrel 30 is taken as an insertion end direction, and so as to contact the orthogonal surface 34 of the lens barrel 30 with the O ring 23, the lens barrel 30 is inserted in the insert hole 11*b* from a side of the larger diameter part 11*f* of the mounting wall 11 (see arrow A1). The smaller diameter part 32 of the lens barrel 30 is positioned in the smaller hole part 11*g* of the insert hole 11*b* of the mounting wall 11, and the screw thread 36 screws the thread groove 11*e* of the smaller hole part 11*g* (inward projection part 11*c*). The flat surface part 37 of the smaller diameter part 32 of the lens barrel 30 is held in the radial direction, and the lens barrel 30 is rotated around the optical axis O, and the front side surface 11*h* of the mounting wall 11 and the orthogonal surface 34 of the lens barrel 30 are press-contacted. Therefore, the lens barrel 30 and the mounting wall 11 are in a positioned state in the radial direction by the above-described positioning in the radial direction part, and appropriately compress the O ring 23 intervening between the front side surface 11*h* and the orthogonal surface 34, and are positioned and fixed in the direction of the optical axis O (see FIG. 16). At this time, in the rear end (second end) part of the lens barrel 30, the light-receiving circuit 50 (image sensor 52) is not provided, therefore the rotation (fixing) operation of the lens barrel 30 with respect to the mounting wall 11 is easily performed. In particular, in the present embodiment, a first space P1 (see FIG. 16) is provided as described later, and in a case where the lens barrel 30 is rotated to fix on the mounting wall 11, there are no other components outside of the smaller diameter part 32 of the lens barrel 30 (a second space is formed), and therefore the rotation operation is performed more easily.

The rotation of the lens barrel 30 by holding the flat surface part 37 can be performed by the hands of operators, tools used by the operators, or machines. Thus, it is possible to prevent water, dust, and the like from entering a gap between the mounting wall 11 and the lens barrel 30 (imaging optical system 20) from a side of the outer surface S of the mounting wall 11 (side where the lens 41 as an objective lens is exposed), and it is possible to fix the lens barrel 30 and the mounting wall 11 in a state of having a sufficient sealing function (see FIG. 16). The positioning and fixing of the light-receiving circuit 50 (image sensor 52 mounted on the substrate 51) with respect to the lens barrel 30 fixed to the mounting wall 11 in a sealed state will be described later.

Figure 16:
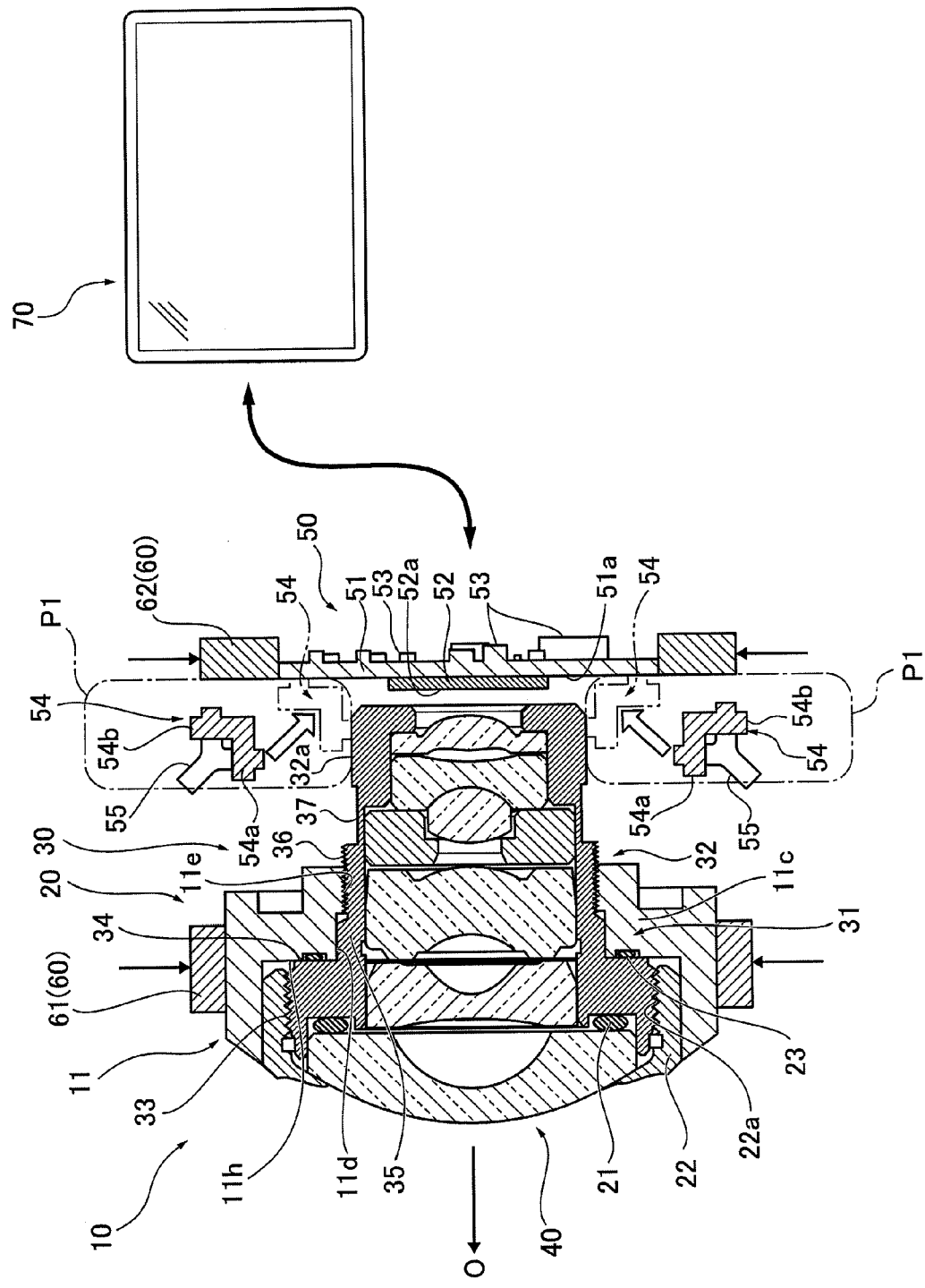
FIG. 16 is a cross-sectional view illustrating a state where the lens barrel 30 and the substrate 51 are positioned and fixed.

Here, as illustrated in FIG. 16, in a state where the lens barrel 30 (imaging optical system 20) is fixed, the mounting wall 11 is structured to be capable of installing the intermediate holder 54 on the outer circumferential surface part 32*a* of the smaller diameter part 32 of the lens barrel 30. In other words, in a state where the imaging optical system 20 is inserted in the insert hole 11*b*, in the direction of the optical axis O, the mounting wall 11 has a size that does not reach an area on the rear end side (outer circumferential surface part 32*a*) on an outer circumferential surface of the smaller diameter part 32 of the lens barrel 30. That is, in the imaging device 10, in a state where the mounting wall 11 and the lens barrel 30 are fixed, there is no component around the outer circumferential surface part 32*a* of the smaller diameter part 32. Therefore, in the imaging device 10 according to the present embodiment, in a state where the mounting wall 11 and the lens barrel 30 are fixed, around the outer circumferential surface part 32*a* of the small diameter part 32, the first space P1 that joins the substrate 51 on which the image sensor 52 is mounted to the lens barrel 30 by welding (structuring a welding structure of the lens barrel 30 and the substrate 51) is formed. The first space P1 is a space for a positioning and fixing operation of the imaging device 10, and therefore after completing the positioning and fixing operation, it is not necessary to secure the first space P1.

Firstly, for positioning, the mounting wall 11 where the lens barrel 30 is fixed in the sealed state is held fixedly by a case holder 61 as an adjusting device 60. On the rear end side (second end side) of the lens barrel 30 that is in a state of being held by the case holder 61, the light-receiving circuit 50 (its substrate 51) is arranged such that the image sensor 52 (its light-receiving surface 52*a*) is positioned on the optical axis O, and the substrate 51 is held by an image sensor holder 62 as the adjusting device 60. The image sensor holder 62 is capable of holding the substrate 51 of the light-receiving circuit 50 in an arbitrary rotating state around the optical axis O. Additionally, the image sensor holder 62 is capable of holding the substrate 51 so as to adjust a tilt of the image sensor 52 (light-receiving surface 52*a*) with respect to the optical axis O of the lens barrel 30, and adjust a position (interval) of the image sensor 52 (its light-receiving surface 52*a*) in the direction of the optical axis O with respect to the lens barrel 30.

The substrate 51 of the light-receiving circuit 50 is held by the image sensor holder 62 such that up, down, right, and left directions of the mounting wall 11 fixedly held by the case holder 61 and up, down, right, and left directions of an image obtained by the image sensor 52 correspond to each other, and the optical axis O of the imaging optical system 20 (optical element group 40) is positioned in the center in the image obtained by the image sensor 52 (center of the light-receiving surface 52*a* of the image sensor 52).

Electric power is supplied to the light-receiving circuit 50 (its electronic component 53) held by the image sensor holder 62 (adjusting device 60), and an image from the light-receiving circuit 50 (its image sensor 52) is in a displayable state on a monitor 70. And then, an image of a photographic subject (not illustrated) at a predetermined distance on the optical axis O of the imaging device 10 is formed by the imaging optical system 20, and an image based on an electric signal (image data) from the image sensor 52 on which the image of the photographic subject is received is displayed on the monitor 70.

In the adjusting device 60, as described above, by functions of the case holder 61 and the image sensor holder 62, adjustment of the tilt of the image sensor 52 (its light-receiving surface 52*a*) with respect to the optical axis O of the lens barrel 30 is possible, and adjustment of a position (interval) of the image sensor 52 (light-receiving surface 52*a*) in the direction of the optical axis O with respect to the lens barrel 30 is possible. Thus, in a state where the up, down, right, and left directions in the obtained image and the up, down, right, and left directions of the mounting wall 11 correspond to each other, the image sensor 52 can be moved in the direction of the optical axis O in a state where the image sensor 52 (light-receiving surface 52a) is perpendicular to the optical axis O. Therefore, it is possible to perform a so-called focus adjustment that adjusts an image-forming position of the imaging optical system 20 to be on the light-receiving surface 52a.

The focus adjustment is performed by appropriately changing the tilt and the position of the image sensor 52 by the image sensor holder 62 with respect to the lens barrel 30 on the mounting wall 11 held by the case holder 61, and determining whether or not an image (photographic subject image) displayed on the monitor 70 is in an appropriate state. The focus adjustment can be performed by visual judgment by an operator, and can be automatically performed by an image analysis (those functions are installed in the adjusting device 60). Therefore, in a state where the image sensor 52 is optically positioned with respect to the optical element group 40, it is possible to relatively fix the lens barrel 30 and the light-receiving circuit 50 (first process).

Figure 17:
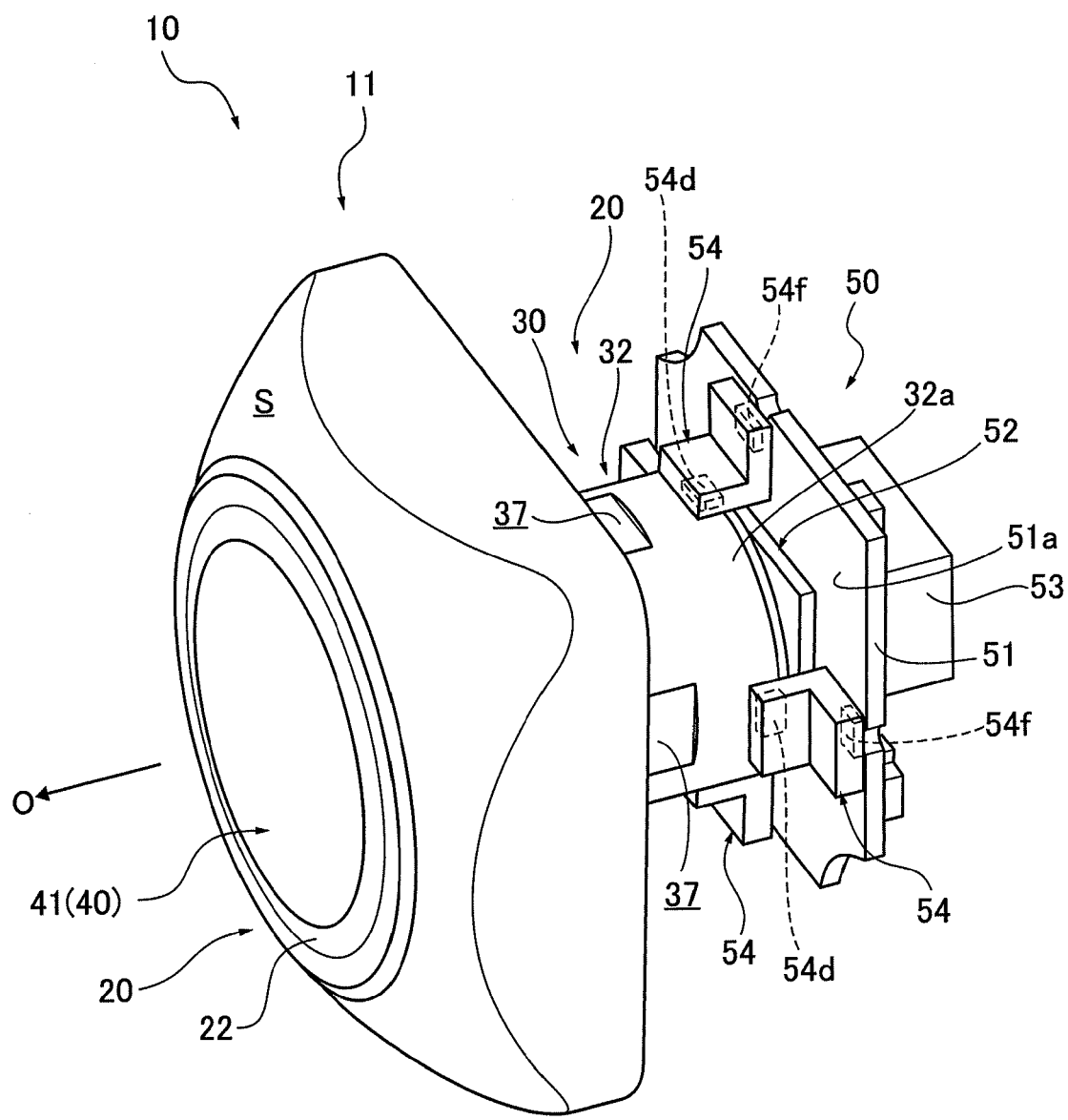
FIG. 17 is a perspective view of the imaging device 10 in which the substrate 51 and the lens barrel 30 are joined by the ultrasonic welding method.
Figure 18:
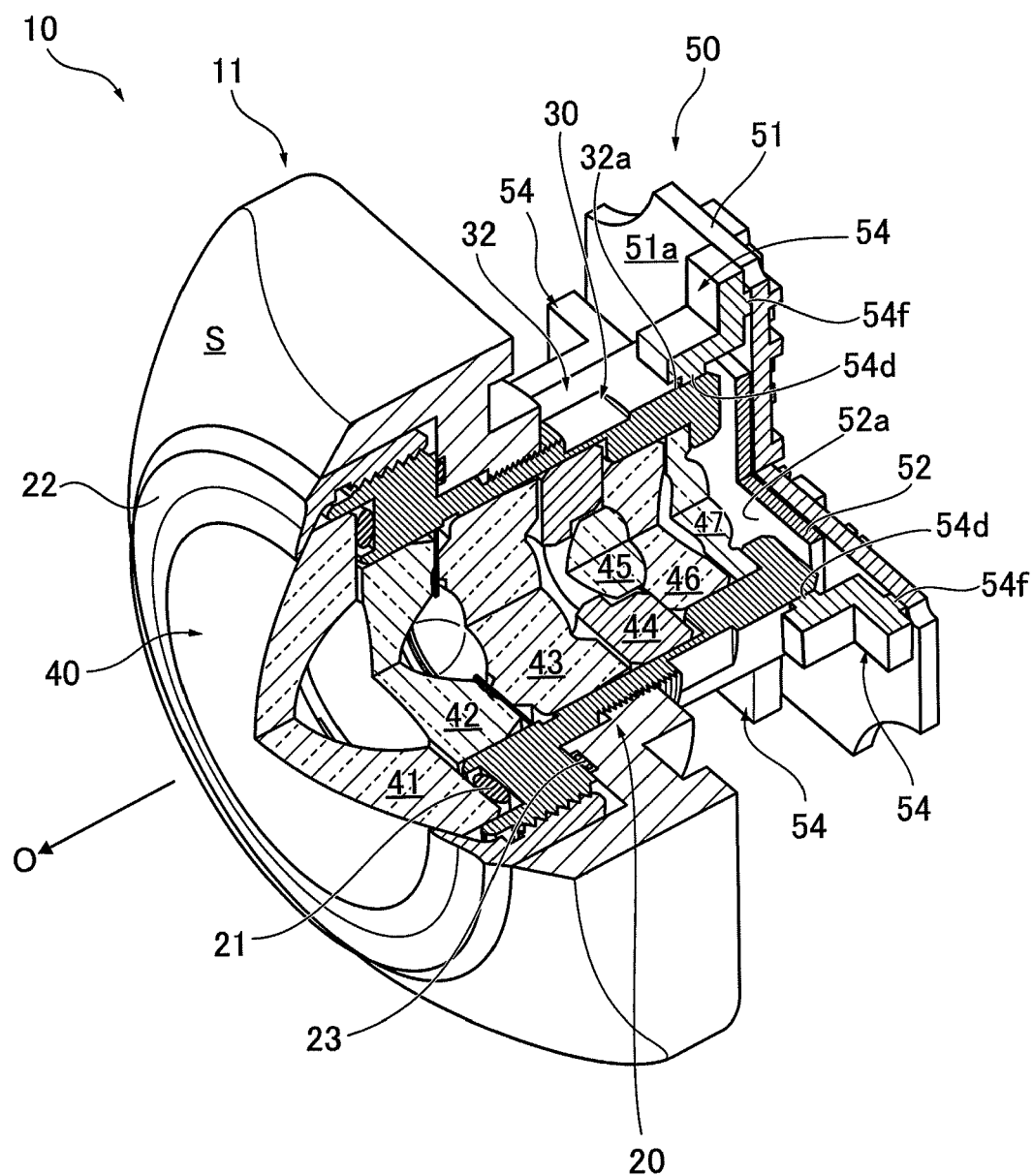
FIG. 18 is a half-sectional perspective view of the imaging device 10 in which the substrate 51 and the lens barrel 30 are joined by the ultrasonic welding method.

When completing the focus adjustment, by the ultrasonic welding method using the intermediate holder 54, the light-receiving circuit 50 is joined to the lens barrel 30 (see FIGS. 2, 17, 18, etc.). In the ultrasonic welding method, four intermediate holders 54 are used in the present embodiment, and each of the four intermediate holders 54 is provided respectively at equal intervals in a circumferential direction of the smaller diameter part 32 (see FIG. 17). In detail, in a state where the lens barrel 30 and the substrate 51 are maintained to be held by the case holder 61 and the image sensor holder 62, that is, in a state where a relative positional relationship between the lens barrel 30 and the substrate 51 is maintained, the intermediate holder 54 sucked and held by the horn 55 is arranged to be bridged between the lens barrel 30 and the substrate 51 (light-receiving circuit 50) (see FIG. 16) (second process). In the present embodiment, the contact part 54d (its end face) on the lens barrel side of the wall part 54a on the lens barrel side of the intermediate holder 54 comes into contact with the outer circumferential surface part 32a of the smaller diameter part 32 of the lens barrel 30 (see FIG. 12). The contact part 54f (its end face) on the light-receiving circuit side of the wall part 54b of the intermediate holder 54 of the lens barrel 30 comes into contact with the surface 51a of the substrate 51 so as to surround the image sensor 52 (see FIG. 12).

In the above state, by applying the ultrasonic vibration and pressing force by the convertor 57 via the horn 55 by which the intermediate holder 54 is sucked and held to the intermediate holder 54, the above-described ultrasonic welding method (third, and fourth processes) is performed. And then, as illustrated in FIGS. 17 and 18, if after fixing and holding by the case holder 61 and the image sensor holder 62 is released, in a state where the positional relationship that is set optically is maintained, the lens barrel 30 and the substrate 51 (image sensor 52) are joined to each other via the intermediate holder 54 by welding. That is, each intermediate holder 54 forms a welding structure that is capable of joining both (the lens barrel 30 and the substrate 51) by welding in a state where the positional relationship between the lens barrel 30 and the substrate 51 (image sensor 52) is maintained in cooperation with the above welded part on the lens barrel side and welded part on the light-receiving circuit side. The positional relationship between the lens barrel 30 and the substrate 51 can maintain a state that is capable of obtaining an optically appropriate image on the image sensor 52 (its light-receiving surface 52a), and a minimal move is allowable in a strict sense.

Figure 19:
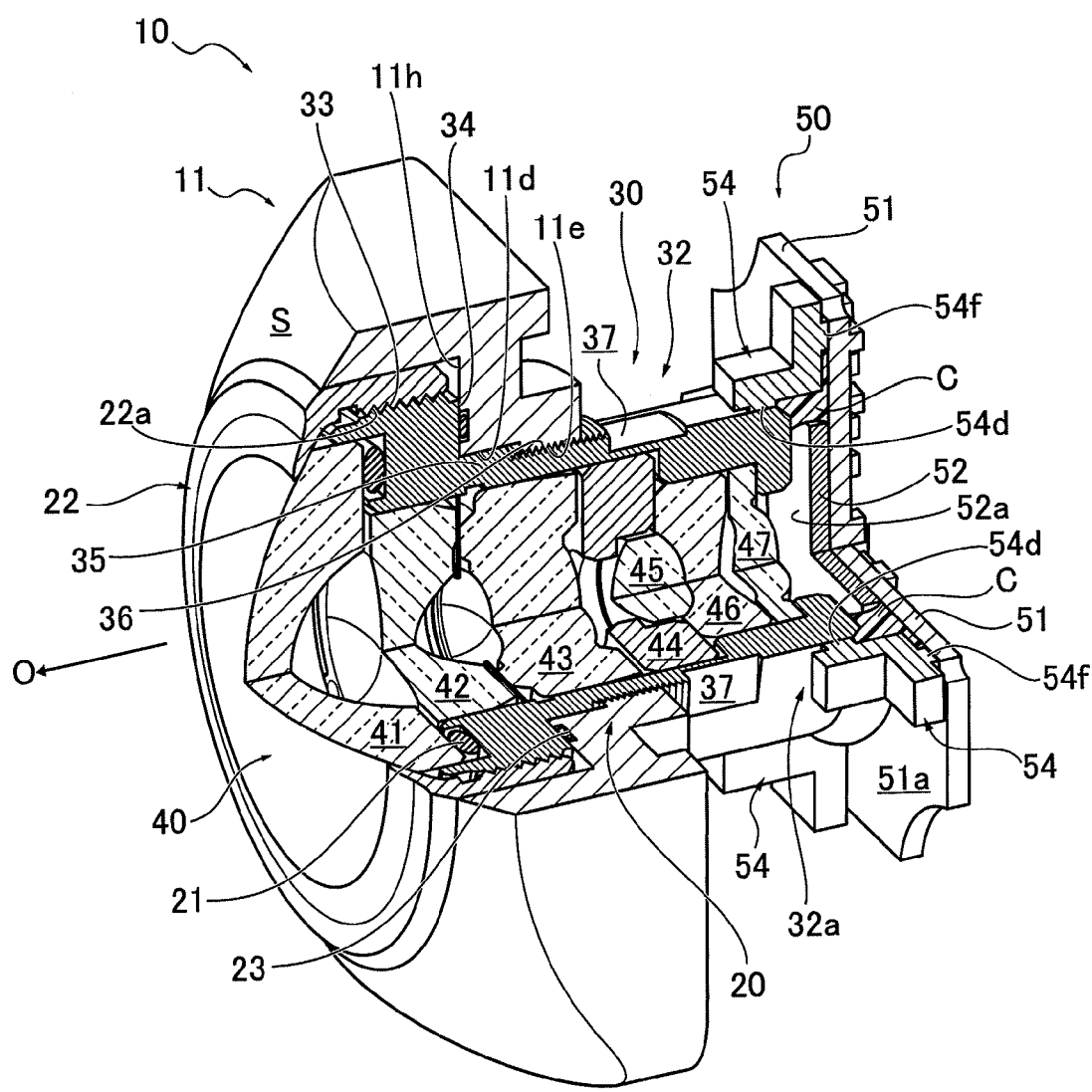
FIG. 19 is a half-sectional perspective view of the imaging device 10 in which an adhesive layer C is provided by an adhesive gap filling method.
Figure 20:
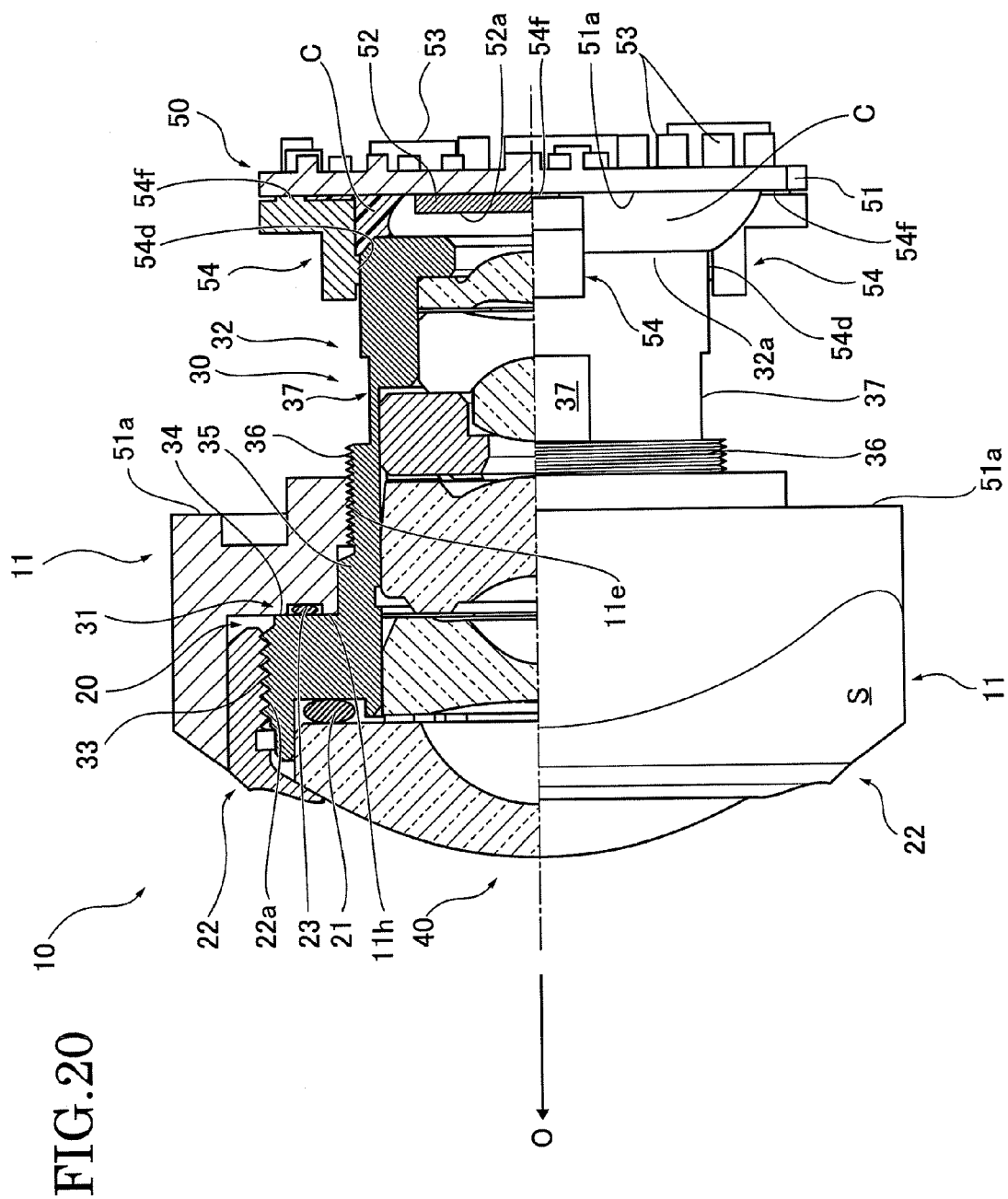
FIG. 20 is a broken-out sectional view of the imaging device 10 in which the lens barrel 30 and the substrate 51 are positioned and fixed.
Figure 21:
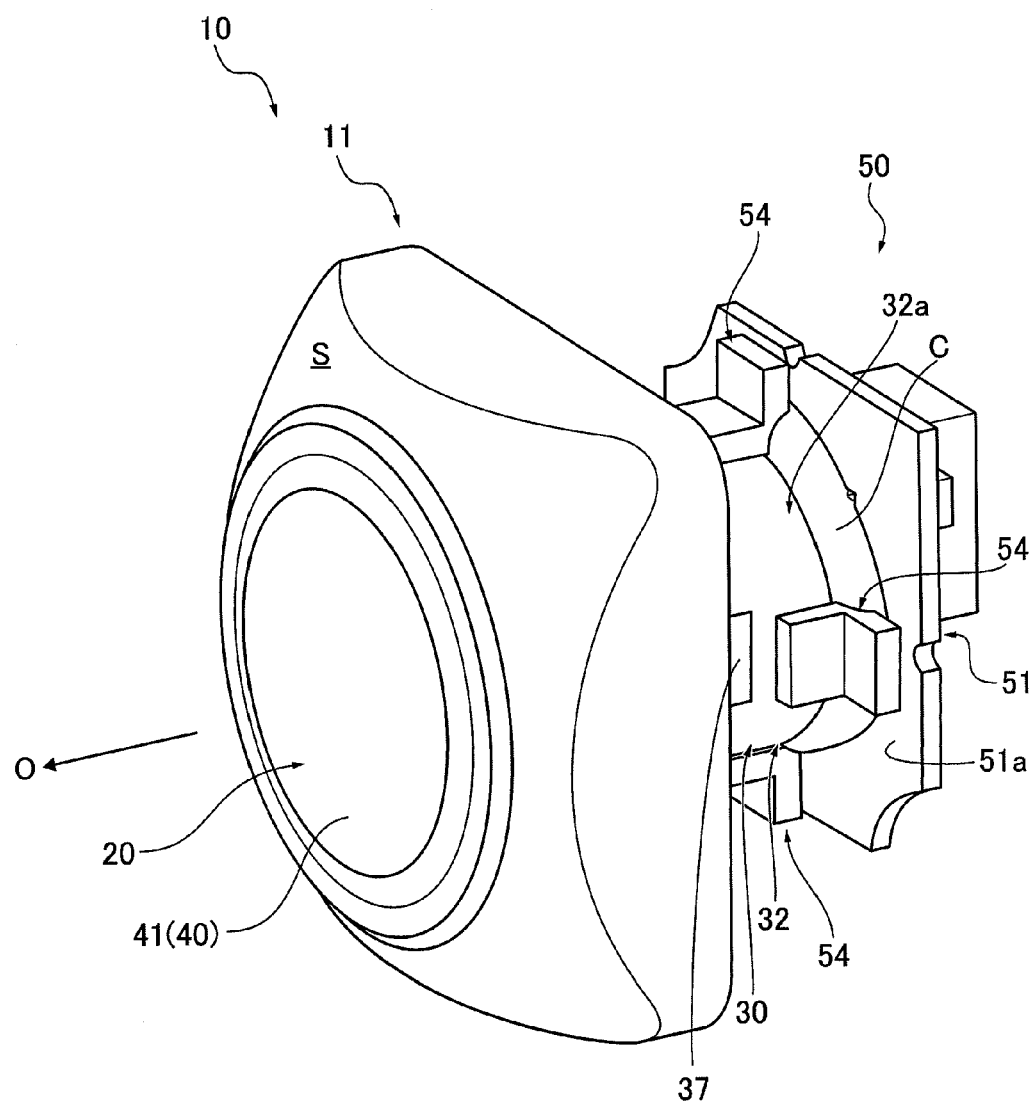
FIG. 21 is a perspective view of the imaging device 10 in which the lens barrel 30 and the substrate 51 are positioned and fixed.

In the present embodiment, after performing the ultrasonic welding method using the above-described intermediate holders 54, an adhesive gap filling method is performed. In the adhesive gap filling method, as illustrated in FIGS. 19, 20, and 21, so as to fill the gap between the lens barrel 30 and the substrate 51 that are joined to each other via the intermediate holder 54, an adhesive layer C that is an adhesive gap filling layer is formed by applying (filling) an adhesive agent. In the present embodiment, in order to form the adhesive layer C, a thermoplastic-type adhesive agent with a light-blocking function is adopted. The adhesive layer C is provided circularly along an outer edge of the second end (outside of inner edge projection 39) of the lens barrel 30, and on the surface 51a of the substrate 51, surrounds the image sensor 52 so as not to interfere with at least an effective area (effective light-receiving area) of the light-receiving area 52a of the image sensor 52. Therefore, in the present embodiment, by applying the adhesive agent to an inner side of the intermediate holder 54 using the first space P1 (see FIG. 16), the adhesive layer C is formed such that a gap surrounded by the inner side of the intermediate holder 54 (side facing mounting wall surface 54c and mounting wall surface 54e), the lens barrel 30 (its rear end), and the substrate 51 (surface 51a) is filled (see FIGS. 19 and 20). After forming the adhesive layer C, by appropriately heating the imaging device 10 by an oven (not illustrated) using the first space P1, the adhesive layer C is hardened. The above is the adhesive gap filling method. At this time, the adhesive layer C shrinks when hardening, however since the lens barrel 30 and the substrate 51 are joined to each other in the positioned state by the welding structure using the above-described intermediate holder 54, the positional relationship between the lens barrel 30 and the substrate 30 is not changed. Therefore, by the adhesive layer C having a light-blocking function that circularly surrounds the image sensor 52, the lens barrel 30 and the substrate 51 are joined in a state where the relative positional relationship by the welding structure is maintained. That is, the circular adhesive layer C forms an adhesive gap filling structure that joins the lens barrel 30 and the substrate 51 by filling the gap between them as a strengthened adhesive layer that increases the joining strength of the lens barrel 30 and the substrate 51 joined in a state where relative positioning is performed by the welding structure.

In a state where the light-receiving circuit 50 (image sensor 52 mounted on substrate 51) is positioned with respect to the lens barrel 30 fixed to the mounting wall 11 in this manner, the lens barrel 30 and the light-receiving circuit 50 (its substrate 51) are fixed, and therefore the imaging device 10 is formed. In the imaging device 10, by means of the O ring 23, water, dust, and the like are prevented from entering between the mounting wall 11 and the lens barrel 30 from the side of the outer surface S of the mounting wall 11 (side where lens 41 as objective lens is exposed) (see FIG. 20). The imaging device 10 has a sufficient sealing function and appropriate optical performance.

In the present embodiment, as illustrated in FIGS. 1 and 2, the rear case part 13 is joined to the mounting wall 11 in a sealed state. Therefore, it is possible to obtain a waterproofing function and a dustproofing function of the imaging optical system 20 and the light-receiving circuit 50 on a rear surface side of the mounting wall 11. And accordingly, the imaging device 10 is capable of mounting to a desired portion via the mounting projections 13b of the rear case part 13, and in spite of an entirely small structure, the imaging device 10 has a high optical performance and sealing function in all directions. The imaging device 10 stored in the case 12 that is structured by joining the mounting wall 11 and the rear case part 13 is suitable as an in-vehicle camera, for example.

Thus, in the imaging device 10 according to the present embodiment of the present invention, in the welding structure that joins the lens barrel 30 (imaging optical system 20) and the light-receiving circuit 50 (substrate 51) by welding, the intermediate holder 54 that is a member different from the lens barrel which holds the imaging optical system 20 and the substrate 51 on which the image sensor 52 is mounted is used, and after softening (melting) the contact part 54*d* on the lens barrel side and the contact part 54*f* on the light-receiving circuit side, they are hardened and form the welded part on the lens barrel side and the welded part on the light-receiving circuit side. As the conventional technique, there is no need to melt a lens barrel and a light-receiving circuit, and therefore the positional relationship of the image sensor 52 (its light-receiving surface 52*a*) with respect to the optical element group 40 that is optically positioned is not changed due to melting, and it is possible to fix the lens barrel 30 (imaging optical system 20) and the light-receiving circuit 50 (substrate 51). Accordingly, it is possible to obtain a more appropriate optical performance.

In the imaging device 10 according to the present embodiment of the present invention, in the welding structure that joins the lens barrel 30 (imaging optical system 20) and the light-receiving circuit 50 (substrate 51) by welding, by use of the intermediate holder 54, the ultrasonic welding method where after the contact part 54*d* on the lens barrel side and the contact part 54*f* on the light-receiving circuit side are softened (melted) at the same time, and they are hardened at the same time, and then the welded part on the lens barrel side and the welded part on the light-receiving circuit side are formed is adopted. This makes it possible to absorb the influence of the shape change of the contact part 54*d* on the lens barrel side and the contact part 54*f* on the light-receiving circuit side, that is, the influence of the shape change of the intermediate holder 54 by displacing (moving) the intermediate holder 54 in directions (pressing directions) getting close to the lens barrel 30 and the light-receiving circuit 50 (substrate 51). Therefore, in a state where the positional relationship that is optically set is maintained, the lens barrel 30 and the substrate 51 are capable of being joined together by welding with a simple structure. Accordingly, it is possible to obtain a more appropriate optical performance.

Additionally, in the imaging device 10 according to the present embodiment of the present invention, the relative positional relationship between the lens barrel 30 and the light-receiving circuit 50 (substrate 51) is fixed, and the intermediate holder 54 is contacted to be bridged between the lens barrel 30 and the light-receiving circuit 50 (substrate 51). Positioning and fixing are performed by the ultrasonic welding where after softening (melting) the contact part 54*d* on the lens barrel side and the contact part 54*f* on the light-receiving circuit side at the same time, they are hardened at the same time, and the welded part on the lens barrel side and the welded part on the light-receiving circuit side are formed. Therefore, it is possible to absorb the influence of the shape change of the intermediate holder 54 due to softening (melting) the contact part 54*d* on the lens barrel side and the contact part 54*f* on the light-receiving circuit side by displacing (moving) the intermediate holder 54 in directions (pressing directions) getting close to the lens barrel 30 and the light-receiving circuit 50 (substrate 51). Therefore, in a state where the positional relationship that is optically set is maintained, the lens barrel 30 and the substrate 51 are capable of being joined together by welding with a simple structure. Accordingly, it is possible to obtain a more appropriate optical performance.

In the imaging device 10 according to the present embodiment of the present invention, since the lens barrel 30 (imaging optical system 20) fixed to the mounting wall 11 and the light-receiving circuit 50 (substrate 51) are joined by welding, compared to a case of joining by use of an adhesive agent, it is possible to position and fix the lens barrel 30 (imaging optical system 20) and the light-receiving circuit 50 (substrate 51) more firmly. Therefore, for example, in a case where the imaging device 10 according to the present embodiment of the present invention is mounted in a car, it is possible to tolerate a disturbance such as oscillation, and the like, and obtain a stable image characteristic (optical performance). Even under the circumstances in which the joining strength in the adhesive agent due to an influence of a temperature change or the like is diminished, it is possible to maintain the positional relationship between the lens barrel 30 and the substrate 51. That is, even under harsh temperature change circumstances, it is possible to obtain a stable image characteristic (optical performance).

In the imaging device 10 according to the present embodiment of the present invention, in the intermediate holder 54 used for the ultrasonic welding method for joining the lens barrel 30 (imaging optical system 20) and the light-receiving circuit 50 (substrate 51), each of the contact part 54*d* on the lens barrel side that comes into contact with the outer circumferential surface part 32*a* of the smaller diameter part 32 of the lens barrel 30 and the contact part 54*f* on the light-receiving circuit side that comes into contact with the surface 51*a* of the substrate 51 of the light-receiving circuit 50 is formed into a convex shape that projects from a flat surface (mounting wall surface 54*c* or mounting wall surface 54*e*), respectively. Therefore, it is possible to concentrate energy for welding by the ultrasonic vibration and pressing force transmitted to the intermediate holder 54 via the horn 55 from the convertor 57 in a smaller range. And accordingly, it is possible to fix the contacted part 54*d* on the lens barrel side and the outer circumferential surface part 32*a* and fix the contacted part 54*f* on the light-receiving circuit side and the surface 51*a* more reliably. Therefore, it is possible to obtain a more stable optical performance.

In the imaging device 10 according to the present embodiment of the present invention, in the ultrasonic welding method for joining the lens barrel 30 (imaging optical system 20) and the light-receiving circuit 50 (substrate 51), the four intermediate holders 54 are respectively arranged in four directions centering on the optical axis O and perpendicular to each other in a plane perpendicular to the optical axis O. Therefore, due to hardening of the welded part on the lens barrel side and the welded part on the light-receiving circuit side in the intermediate holder 54, if a force that moves the substrate 51 in the radial direction acts, it is possible to cancel the force by an arrangement relationship of the four intermediate holders 54. Therefore, in the ultrasonic welding method, it is possible to prevent a change of the positional relationship between the lens barrel 30 and the substrate 51 more reliably.

In the imaging device 10 according to the present embodiment of the present invention, in the welding structure, the L-shaped intermediate holder 54 in which the contact part 54*d* on the lens barrel side of the wall part 54*a* on the lens barrel side is contacted to the outer circumferential part 32*a* of the smaller diameter part 32 of the lens barrel 30, and the contact part 54*f* on the light-receiving circuit side of the wall part 54*b* on the substrate side is contacted to the surface 51*a* of the substrate 51 are bridged between the lens barrel 30 and the substrate 51. Therefore, it is possible to fix the lens barrel 30 and the substrate 51 more firmly. And accordingly, even in a case where the joining strength in the adhesive layer C is diminished due to the influence of a temperature change or the like, it is possible to maintain the positional relationship between the lens barrel 30 and the substrate 51. Therefore, even under harsh temperature change circumstances, it is possible to obtain a stable image characteristic.

In the imaging device 10 according to the present embodiment of the present invention, in a structure that joins the lens barrel 30 (imaging optical system 20) fixed to the mounting wall 11 and the light-receiving circuit 50 (substrate 51), the adhesive gap filling method that fills the gap between the lens barrel 30 and the substrate 51 joined in a state where the relative positioning is performed by the welding structure with the adhesive layer C is adopted (strengthened adhesive layer is formed). Therefore, in a state where the positional relationship that is optically set is maintained, it is possible to join the lens barrel 30 and the substrate 51 to each other more firmly by welding and adhesion with a simple structure. Accordingly, it is possible to obtain a more appropriate optical performance.

In the imaging device 10 according to the present embodiment of the present invention, in a case where the lens barrel 30 (imaging optical system 20) and the substrate 51 (image sensor 52 of light-receiving circuit 52) are joined, after performing the ultrasonic welding method the adhesive gap filling method is performed. Therefore, the positional relationship between the image sensor 52 (substrate 51) and the optical element group 40 (lens barrel 30) that are optically positioned is maintained, and the lens barrel 30 and the substrate 51 are capable of being joined more firmly.

In the imaging device 10 according to the present embodiment of the present invention, the gap between the lens barrel 30 and the substrate 51 is filled with the adhesive layer C having a light-blocking function. Therefore, it is possible to reliably prevent a foreign object from entering the light-receiving surface 52a of the image sensor 52 from outside of the lens barrel 30, and it is possible to prevent light from outside of the lens barrel 30 from entering the light-receiving surface 52a. Therefore, it is possible to obtain a clearer image.

In the imaging device 10 according to the present embodiment of the present invention, in a state where the up, down, right, and left directions in the obtained image and the up, down, right, and left directions of the mounting wall 11 correspond and in a state where the focus adjustment between the imaging optical system 20 and the image sensor 52 is performed, the lens barrel 30 fixed to the mounting wall 11 and the substrate 51, that is, the lens barrel 30 fixed to the mounting wall 11 and the image sensor 52 are capable of being joined by the welding structure. Therefore, as the mounting wall 11, it is possible to adopt a shape that specifies the up, down, right, and left directions from an appearance configuration, and accordingly, it is possible to improve dramatically the degree of freedom of design of the mounting wall 11, that is, a case.

In the imaging device 10 according to the present embodiment of the present invention, the light-receiving circuit 50 (substrate 51) is joined (positioned and fixed) to the lens barrel 30 (imaging optical system 20) fixed to the mounting wall 11 by the welding structure. Therefore, in a state where the image sensor 52 (its light-receiving surface 52a) is optically positioned with respect to the lens barrel 30 (optical element group 40), the lens barrel 30 and the light-receiving circuit 50 (substrate 51) are capable of being joined by the welding structure, that is, it is possible to obtain an appropriate optical performance and consider (design appropriately) an appearance configuration of the mounting wall 11.

In the imaging device 10 according to the present embodiment of the present invention, in a state where the lens barrel 30 (imaging optical system 20) is fixed to the mounting wall 11, it is possible to perform the focus adjustment of the imaging device 10, in a state where the up, down, right, and left directions of the mounting wall 11 and the up, down, right, and left directions of the obtained image correspond. Therefore, it is possible to eliminate an influence of tolerance in each component of the optical element group 40, and obtain an appropriate optical performance.

In the imaging device according to the present embodiment of the present invention, in a state where the smaller diameter part 32 of the lens barrel 30 is inserted in the insert hole 11b of the mounting wall 11, a rear end (outer circumferential surface part 32a) is exposed, that is, the first space P1 is formed. Therefore, it is easily possible to join the lens barrel 30 and the substrate 51 on which the image sensor 52 is mounted (structure welding structure) by the ultrasonic welding method using the intermediate holder 54.

In the imaging device 10 according to the present embodiment of the present invention, in a state where the lens barrel 30 (imaging optical system 20) is fixed to the mounting wall 11, the lens barrel 30 is positioned in the radial direction in the insert hole 11b of the mounting wall 11 by contact of the positioning surface 11d of the smaller hole part 11g of the insert hole 11b of the mounting wall 11 and the positioning part 35 of the smaller diameter part 32 of the lens barrel 30. Additionally, since the central axis of the mounting wall 11 (insert hole 11b) and the central axis of the lens barrel 30 (holder hole 38) correspond, the image sensor 52 is optically positioned with respect to the lens barrel 30 that holds the optical element group 40, and therefore it is possible to obtain a more appropriate optical performance.

In the imaging device 10 according to the present embodiment of the present invention, the positioning in the radial direction part is formed by the positioning surface 11d of the smaller hole part 11g of the insert hole 11b of the mounting wall 11 and the positioning part 35 of the smaller diameter part 32 of the lens barrel 30, and additionally, as a fixer to fix the mounting wall 11 and the lens barrel 30, the screw groove 11e of the smaller hole part 11g of the mounting wall 11 and the screw thread 36 of the smaller diameter part 32 of the lens barrel 30 are provided. Therefore, it is possible to position the lens barrel 30 in the radial direction in the insert hole 11b of the mounting wall 11 with higher accuracy, and fix the mounting wall 11 and the lens barrel 30 more appropriately.

In the imaging device 10 according to the present embodiment of the present invention, the lens barrel 30 and the mounting wall 11 are fixed by screwing the screw groove 11e of the smaller hole part 11g of the mounting wall 11 and the screw thread 36 of the smaller diameter part 32 of the lens barrel 30. Therefore, it is possible to further consolidate this fixing relationship, and suppress a change of fixing strength with a change of temperature, and accordingly, it is possible to obtain a stable optical image characteristic with high quality. Therefore, for example, in a state of being mounted in a car, it is possible to tolerate a disturbance such as oscillation or the like, and a difference of a temperature condition, and obtain a stable optical image characteristic.

In the imaging device 10 according to the present embodiment of the present invention, the O ring 23 is compressed between the mounting wall 11 and the lens barrel 30 by screwing the screw groove 11e of the smaller hole part 11g of the mounting wall 11 and the screw thread 36 of the smaller diameter part 32 of the lens barrel 30, therefore it is possible to obtain a more reliable sealing function.

In the imaging device 10 according to the present embodiment of the present invention, since the flat surface part 37 is provided in the lens barrel 30, it is possible to easily perform the rotation operation around the optical axis O of the lens barrel with respect to the mounting wall, that is, easily fix the lens barrel 30 to the mounting wall 11.

In the imaging device 10 according to the present embodiment of the present invention, in a case where the lens barrel 30 is fixed to the mounting wall 11, at the rear end part (second end part) of the lens barrel 30, the light-receiving circuit 50 (image sensor 52) is not provided yet. Therefore, it is possible to easily perform the rotation operation (fixing operation) of the lens barrel 30 with respect to the mounting wall 11.

In the imaging device 10 according to the present embodiment of the present invention, the O ring 23 that seals between the mounting wall 11 and the lens barrel 30 is arranged between the orthogonal surface 34 of the lens barrel 30 perpendicular to the optical axis O and the front side surface 11h of the mounting wall 11 perpendicular to the optical axis O. Therefore, even in a case where the lens barrel 30 leans anywhere in the radial direction in the insert hole 11b of the mounting wall 11, it is possible to appropriately compress the O ring 23 between the mounting wall 11 and the lens barrel 30 without an influence of leaning, and accordingly, it is possible to appropriately obtain a sealing function.

In the imaging device 10 according to the present embodiment of the present invention, the rear case part 13 is joined to the mounting wall 11 in the sealed state, and therefore, in all directions of the case 12, it is possible to have waterproofing and dustproofing functions with respect to the lens barrel 30 (optical element group 40 held therein) and the image sensor 52 (light-receiving circuit 50) stored in the case 12.

In the imaging device 10 according to the present embodiment of the present invention, the optical element group 40 is held by the lens barrel 30 different from the mounting wall 11, and the light-receiving circuit 50 (image sensor 52) is fixed to the lens barrel 30. Therefore, for example, even in a case where the mounting wall 11 that forms the outer surface S transforms due to outside air temperature or sunlight irradiation, it is possible to prevent an influence of the above from affecting the positional relationship between the optical element group 40 and the image sensor 52 (its light-receiving surface 52a) that are optically positioned. And accordingly, it is possible to obtain a stable image characteristic with high quality.

In the imaging device 10 according to the present embodiment of the present invention, since the optical element group 40 is held by the lens barrel 30 different from the mounting wall 11, even in a case where the appearance configuration of the mounting wall 11 or the case 12 is changed, it is possible to easily maintain a high optical performance, and increase the degree of freedom of design of the appearance configuration. The reasons are as follows. In the optical element group 40, in order to obtain a predetermined optical performance, optical elements such as a lens and so on need to be held in a positioned state with extremely high accuracy. This is especially important in a case where a plurality of optical elements are used, as in the present embodiment. Therefore, for example, if an optical element is directly held by a case and the case is formed by resin molding, every time an appearance configuration of the case is changed, it is necessary to make a metal mold with extremely high accuracy in order to secure high accuracy in a portion where the optical element is held. That is, it is not easy to maintain a high optical performance. Additionally, if an optical element is directly held by a case, and for example, the case is formed by resin molding, in order to avoid various uneven thicknesses according to a shape and an influence of uneven resin flow in a metal mold to secure accuracy of the case (portion where the optical element is held), an appearance configuration of the case may be limited. On the other hand, in the imaging device 10 according to the present embodiment of the present invention, the lens barrel 30 itself is not changed (lens barrel 30 is commonalized), and it is possible to design a shape of the mounting wall 11 freely, and only a potion where the lens barrel 30 is fixed to the mounting wall 11 can be a common shape. Therefore, a change of the appearance configuration of the mounting wall 11 does not affect a state where the optical element group 40 is held, that is, optical performance, and conversely, in order to ensure optical performance, a change of design of the appearance configuration of the mounting wall 11 is not limited.

In the imaging device 10 according to the present embodiment of the present invention, the lens barrel 30 (imaging optical system 20) and the substrate 51 (image sensor 52 of light-receiving circuit 50) are positioned and fixed to the mounting wall 11 in a sealed state. Therefore, the mounting wall 11 is mounted to a desired portion, for example, mounted to compose a part of an electronic device or a wall surface of a building, and accordingly, it is possible to easily use the imaging device 10 as a surveillance camera having a sealing function in the desired portion.

In the imaging device 10 according to the present embodiment of the present invention, before joining the light-receiving circuit 50 (substrate 51) and the lens barrel 30 by the welding structure, the smaller diameter part 32 of the lens barrel 30 is inserted in the insert hole 11b of the mounting wall 11, and the screw thread 36 of the smaller diameter part 32 screws the thread groove 11e of the smaller hole part 11g, and therefore it is possible to fix the mounting wall 11 and the lens barrel 30 in a sealed state. Therefore, in order to fix the mounting wall 11 and the lens barrel 30, there is no need to notch a part of a substrate on which an image sensor is provided so as to insert a fixing tool in the direction of the optical axis O (there is no need to provide an area for a notch in the substrate), and it is possible to greatly contribute to miniaturizing the imaging device 10.

Therefore, in the imaging device 10 according to the present embodiment of the present invention, it is possible to position and fix the lens barrel 30 and the light-receiving circuit 50 (substrate 51) with high positional (adjustment) accuracy where the positional relationship of the image sensor 52 (light-receiving surface 52a) with respect to the optical element group 40 optically positioned is maintained.

In the present embodiment, in the intermediate holder 54, each of the contact part 54d on the lens barrel side and the contact part 54f on the light-receiving circuit side is respectively formed into the convex shape that projects from the flat surface (mounting wall surface 54c or mounting wall surface 54e); however, if a contact part on a lens barrel side comes into contact with the outer circumferential surface part 32a of the smaller diameter part 32 of the lens barrel 30 for the ultrasonic welding method and a contact part on a light-receiving circuit side comes into contact with the surface 51a of the substrate 51 of the light-receiving circuit 50 for the ultrasonic welding method, they can be the mounting wall surface 54c or the mounting wall surface 54e, and can be formed into another shape that projects from those, and are not limited to the present embodiment.

Embodiment 2

Figure 22:
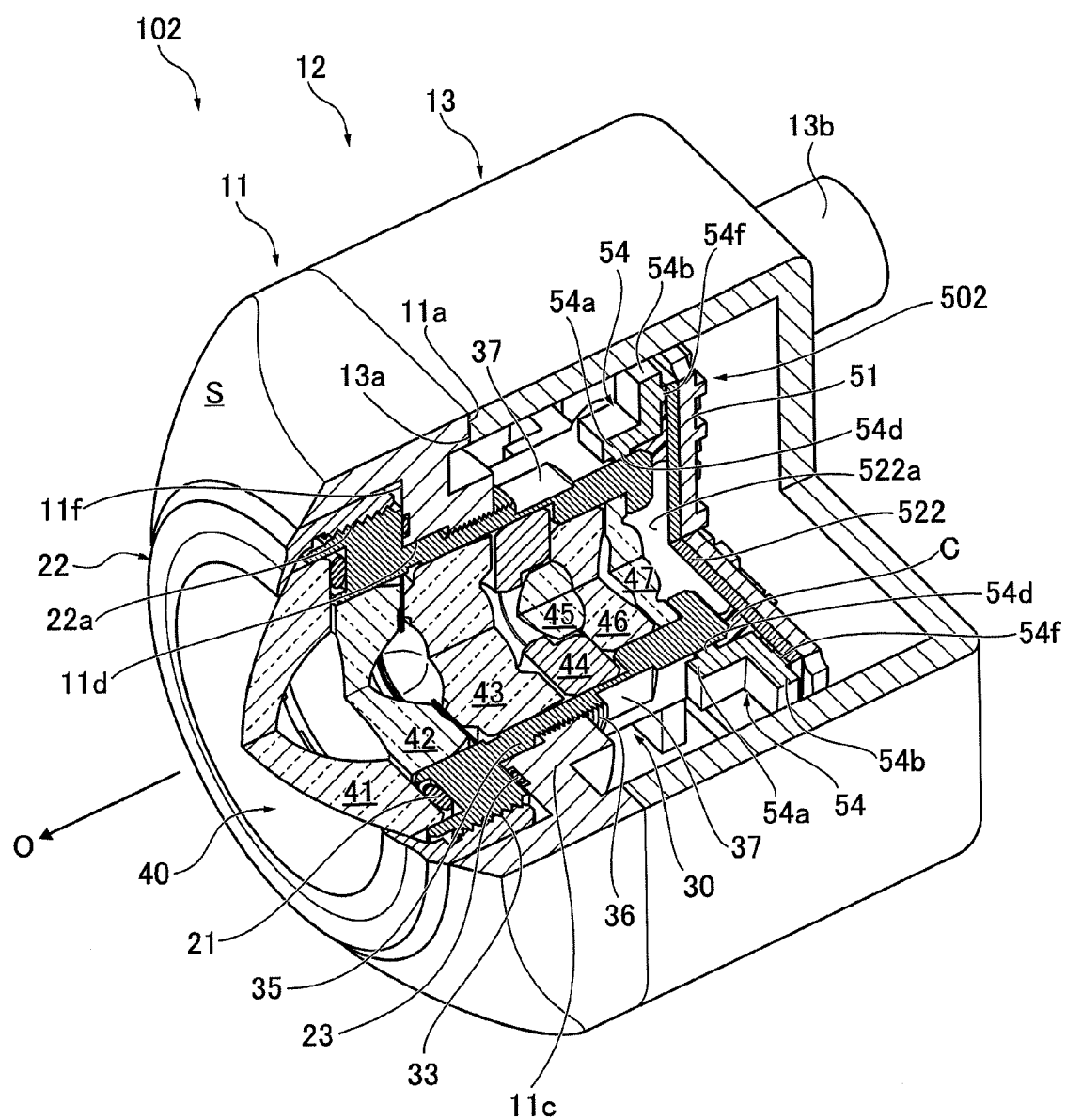
FIG. 22 is a half-sectional perspective view of an imaging device 102 according to Embodiment 2 of the present invention.
Figure 23:
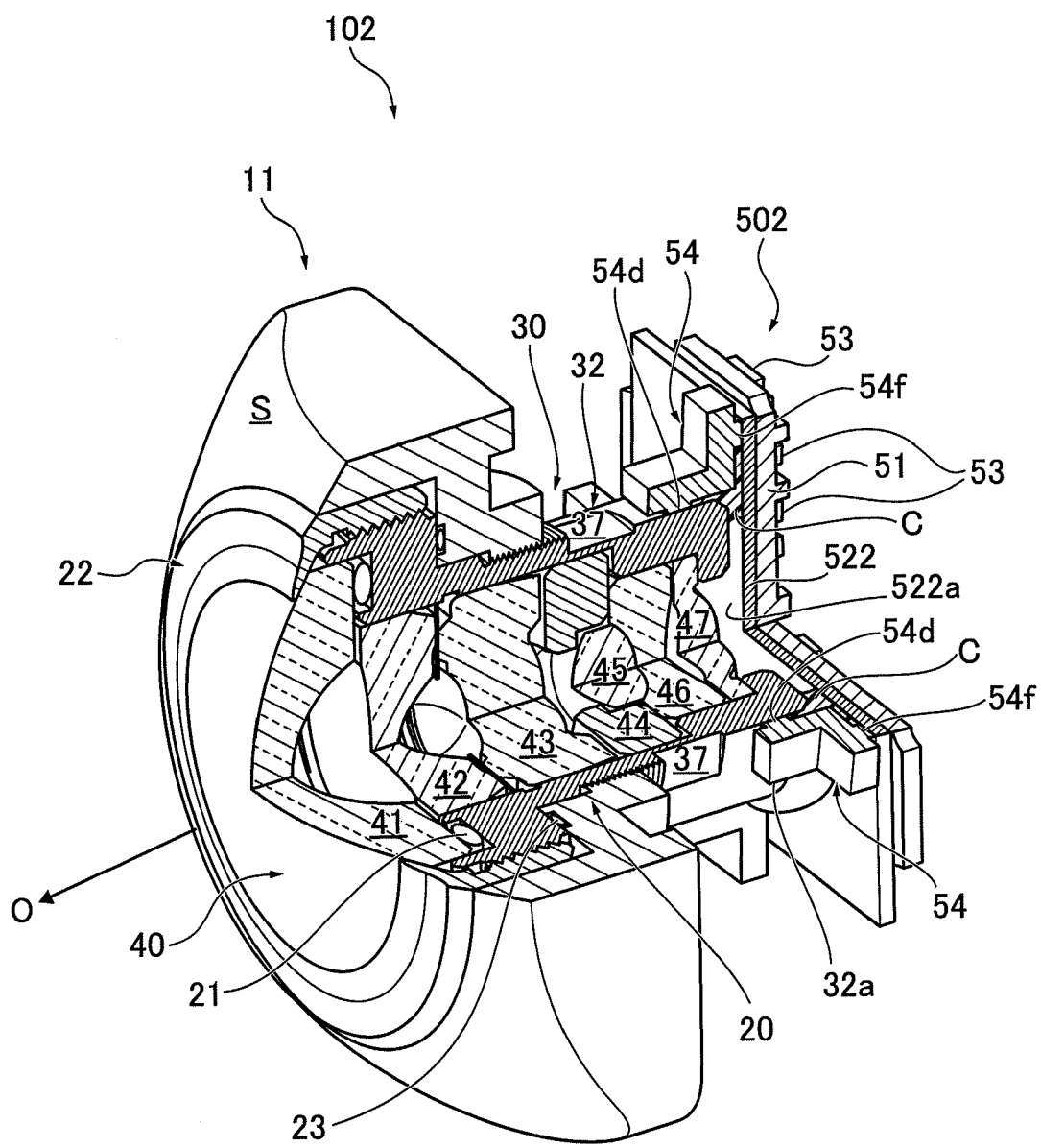
FIG. 23 is a half-sectional perspective view of the imaging device 102 where a rear case part 13 is removed according to Embodiment 2 of the present invention.
Figure 24:
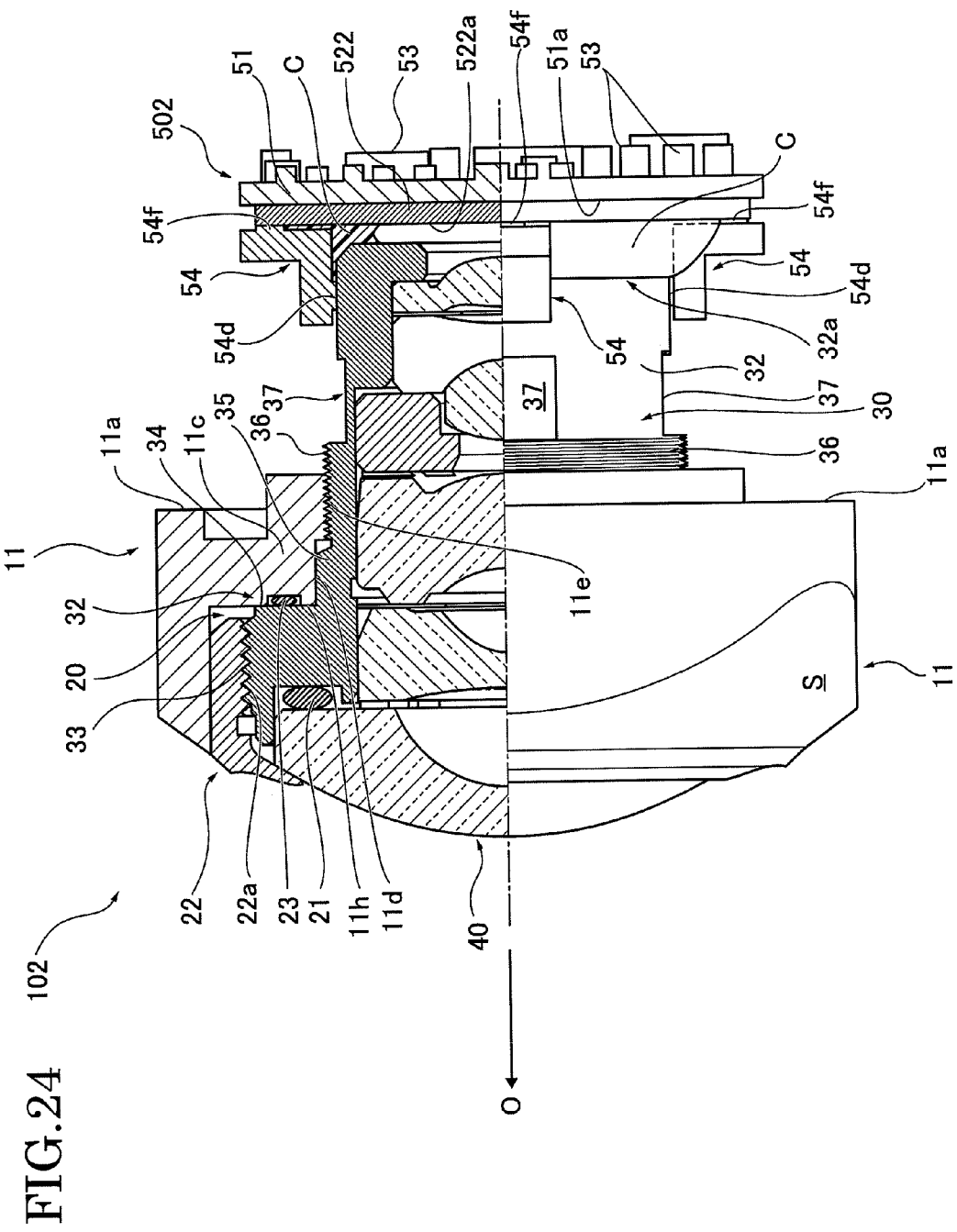
FIG. 24 is a broken-out sectional view of the imaging device 102 according to Embodiment 2 of the present invention.
Figure 25:
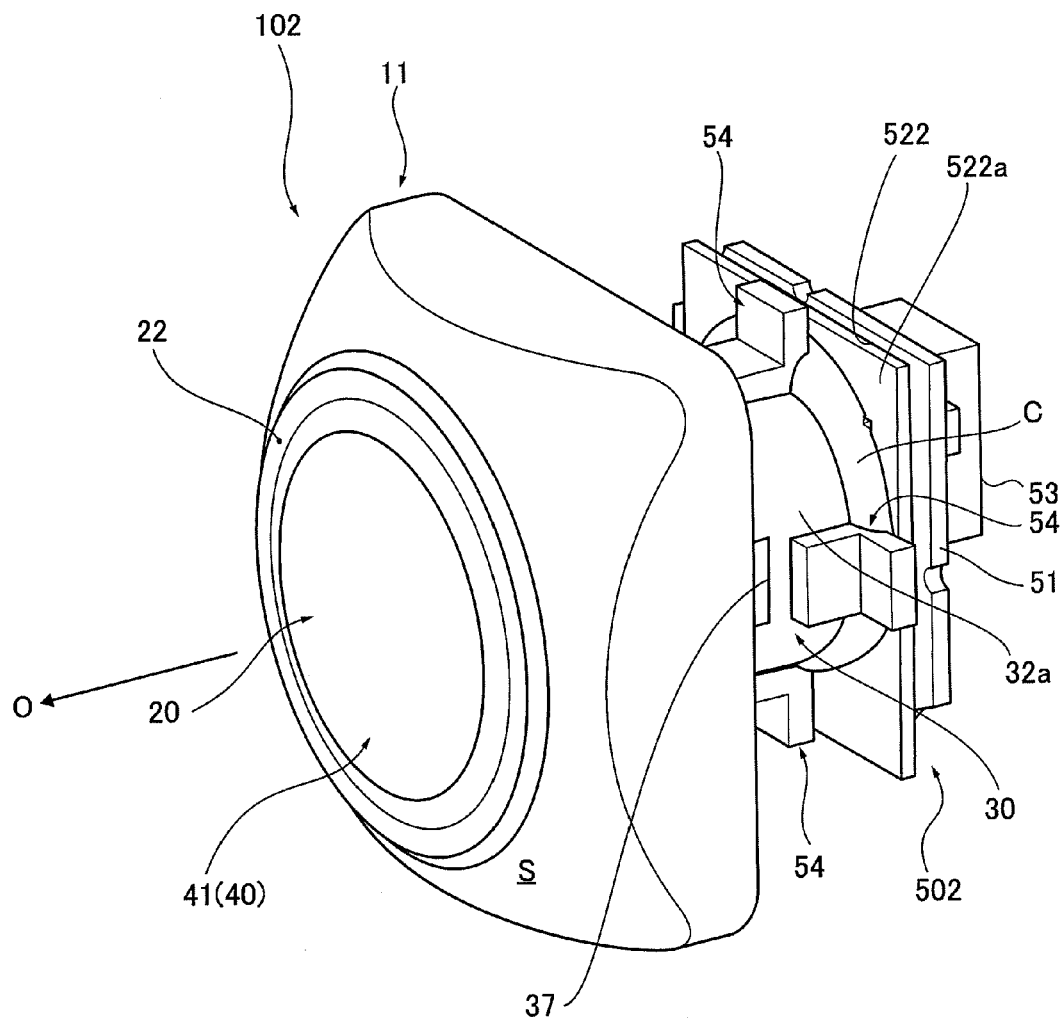
FIG. 25 is a perspective view of the imaging device 102 according to Embodiment 2 of the present invention.

Next, an imaging device 102 according to Embodiment 2 of the present invention will be explained. The present embodiment is an example of a welding structure joining a light-receiving circuit 502 (substrate 51) and the lens barrel 30 that is different from Embodiment 1. Since the imaging device 102 according to the present embodiment has basically the same structure as the imaging device 10 according to Embodiment 1, parts of the same structures as Embodiment 1 have the same reference signs and detailed explanations are omitted. FIG. 22 is a half-sectional perspective view of the imaging device 102 according to the present embodiment. FIG. 23 is a half-sectional perspective view of the imaging device 102 according to the present embodiment of the present invention where a rear case part is removed. FIG. 24 is a broken-out sectional view of the imaging device 102 according to the present embodiment. FIG. 25 is a perspective view of the imaging device 102 according to the present embodiment.

In the imaging device 102 according to the present embodiment, as illustrated in FIGS. 22 to 25, in the welding structure where the light-receiving circuit 502 is joined to the lens barrel 30 by welding, the substrate 51 is not joined to the lens barrel 30, but an image sensor 522 is directly joined to the lens barrel 30. In the light-receiving circuit 502, the size of the image sensor 522 in a plane perpendicular to the optical axis O is the same as that of the substrate 51.

In the imaging device 102, similarly to Embodiment 1, before the light-receiving circuit 502 (image sensor 522 mounted on substrate 51) is positioned and fixed with respect to the lens barrel 30, the imaging optical system 20 and the mounting wall 11 are fixed (see FIG. 15). By use of the adjuster 60 (see FIG. 16), the lens barrel 30 (optical element group 40 held therein) and the image sensor 522 are optically positioned (focus adjustment is performed) (first process).

Then, in a state where the positional relationship between the lens barrel 30 and the image sensor 522 (light receiving circuit 502) is maintained, the intermediate holder 54 sucked and held by the horn 55 is arranged to be bridged between the lens barrel 30 and the image sensor 522 (light-receiving circuit 502) (see FIG. 16) (second process). In the present embodiment, the contact part 54d (its end face) on the lens barrel side of the wall part 54a on the lens barrel side of the intermediate holder 54 comes into contact with the outer circumferential surface 32a of the smaller diameter part 32 of the lens barrel 30, similarly to Embodiment 1. And additionally, the wall part 54b on the substrate side of the intermediate holder 54 faces an area other than an effective area (effective light-receiving area) in a light-receiving surface 522a of the image sensor 522, and the contact part 54f (its end face) on the light-receiving circuit side comes into contact with an area other than the effective area (effective light-receiving area) in the light-receiving surface 522a. Therefore, in the present embodiment, the area other than the effective area (effective light-receiving area) in the light-receiving surface 522a of the image sensor 522 functions as a contact portion of the light-receiving circuit 502.

And in a state where the intermediate holder 54 is bridged between the lens barrel 30 and the image sensor 522 (light-receiving circuit 502) and contacted, the above-described ultrasonic welding method is performed by applying ultrasonic vibration and a pressing force by the convertor 57 via the horn 54 by which the intermediate holder 54 is sucked and held (see FIG. 13, etc.) (third and fourth processes). Therefore, even if fixing and holding of the lens barrel 30 and the image sensor 522 by the adjuster 60 are released, the lens barrel 30 and the image sensor 522 are joined together via the intermediate holder 54 by welding in a state where the positional relationship optically set is maintained.

In the present embodiment, after performing the ultrasonic welding method using the above-described intermediate holder 54, similarly to Embodiment 1, the adhesive layer C is formed by a thermoplastic-type adhesive agent, and an adhesive gap filling method is performed. The adhesive layer C is provided circularly along an outer edge of a rear end (outside of inner edge projection part 39) of the lens barrel 30, and in the light-receiving surface 522a of the image sensor 522, the adhesive layer C does not interfere with at least the effective area (effective light-receiving area).

The imaging device 102 according to the present embodiment has basically the same structure as the imaging device 10 according to Embodiment 1, therefore it is possible to basically obtain the same effects as in Embodiment 1.

In addition, in the imaging device 102 according to the present embodiment, components to join the lens barrel 30 and the image sensor 522 can be reduced (not via substrate 51), therefore an influence of transformation due to production error or temperature change in each component is reduced, and it is possible to obtain an image characteristic with higher accuracy.

Additionally, in the imaging device 102 according to the present embodiment, compared to the structure of Embodiment 1, a larger-sized image sensor 522 can be used for the lens barrel 30 (optical element group 40) and the substrate 51, and therefore it is possible to obtain a clearer image.

Furthermore, in the imaging device 102 according to 102, compared to the structure of Embodiment 1, it is possible to make the size of the lens barrel 30 (optical element group 40), the substrate 41, and the like smaller for the image sensor 522, and therefore it is possible to contribute greatly to miniaturization of the imaging device 102.

Therefore, in the imaging device 102 according to the present embodiment, it is possible to position and fix the lens barrel 30 and the light-receiving circuit 502 (image sensor 522) with high adjustment accuracy where the positional relationship between the optical element group 40 and the image sensor 522 (light-receiving surface 522a) optically positioned is maintained.

In the present embodiment, in the intermediate holder 54, each of the contact part 54d on the lens barrel side and the contact part 54f on the light-receiving circuit side is formed into the convex shape that projects from the flat surface (mounting wall surface 54c or mounting wall surface 54e), respectively. However, if a contact part on a lens barrel side comes into contact with the outer circumferential surface part 32a of the smaller diameter part 32 of the lens barrel 30 for the ultrasonic welding method, and a contact part on a light-receiving circuit side comes into contact with the light-receiving surface 522a of the image sensor 522 of the light-receiving circuit 502 for the ultrasonic welding method, the contact part on the lens barrel side and the contact part on the light-receiving circuit side can be the mounting wall surface 54c and the mounting wall surface 54e, respectively, and they can be formed into any other shapes that project from the mounting wall surface 54c and the mounting wall surface 54e, and are not limited to the present embodiment.

Embodiment 3

Figure 26:
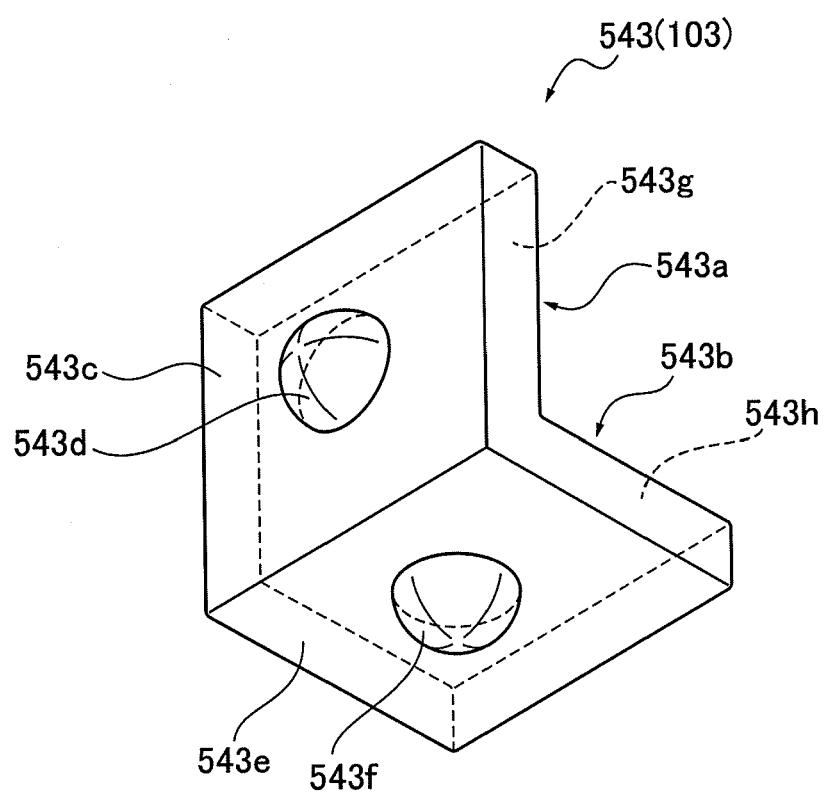
FIG. 26 is a perspective view of an intermediate holder 543 that is used for a welding structure of an imaging device 103 according to Embodiment 3 of the present invention.

Next, an imaging device 103 according to Embodiment 3 of the present invention will be explained. The present embodiment is an example of a welding structure joining the light-receiving circuit 50 (substrate 51) and the lens barrel 30 that is different from Embodiment 1. Since the imaging device 103 according to the present embodiment has basically the same structure as the imaging device 10 according to Embodiment 1, parts of the same structures as in Embodiment 1 have the same reference signs and detailed explanations are omitted. FIG. 26 is a perspective view of an intermediate holder 543 using a welding structure of the imaging device 103 according to the present embodiment.

In the imaging device 103 according to the present embodiment, as illustrated in FIG. 26, for the ultrasonic welding method, that is, in order to form the welding structure, the intermediate holder 543 is used. The intermediate holder 543, similarly to the intermediate holder 54 according to Embodiment 1, structures the welding structure for joining the image sensor 52, or the substrate 51 on which the image sensor 52 is mounted with respect to the lens barrel 30 by welding in a state (positional relationship) where a position of the image sensor 52 (its light-receiving surface 52a) with respect to the optical element group 40 is optically positioned such that an image-forming position of the imaging optical system 20 (optical element group 40) is on the light-receiving surface 52a of the image sensor 52. A basic structure of the intermediate holder 543 is the same as the intermediate holder 54 according to Embodiment 1, and a difference from the intermediate holder 54 is that each of a contact part 543d on the lens barrel side and a contact part 543f on the light-receiving circuit side is formed into a spherical shape (spherical surface shape) that projects from a flat surface (mounting wall surface 543c or mounting wall surface 543e), respectively, as an example of the convex shape. Here, it is formed into a hemisphere shape, as an example of the spherical shape.

In the imaging device 103 according to the present embodiment, similarly to Embodiment 1, before the light-receiving circuit 50 (image sensor 52 mounted on substrate 51) is positioned and fixed with respect to the lens barrel 30, the imaging optical system 20 and the mounting wall 11 are fixed (see FIG. 15). By use of the adjuster 60 (see FIG. 16), the lens barrel 30 (optical element group 40 held therein) and the image sensor 52 are optically positioned (focus adjustment is performed) (first process).

Then, in a state where a positional relationship between the lens barrel 30 and the image sensor 52 is maintained, the intermediate holder 543 sucked and held by the horn 55 is arranged to be bridged between the lens barrel 30 and the substrate 51 (light-receiving circuit 50) (see FIG. 16) (second process). In the present embodiment, similarly to the contact part 54d (its end face) on the lens barrel side according to Embodiment 1, the contact part 543d (its end part) on the lens barrel side of the wall part 543a on the lens barrel side of the intermediate holder 54 comes into contact with the outer circumferential surface part 32a of the smaller diameter part 32 of the lens barrel 30. And, similarly to the contact part 54f (its end face) on the light-receiving circuit side according to Embodiment 1, the contact part 543f (its end part) on the light-receiving circuit side of a wall part 543b on a substrate side of the intermediate holder 543 comes into contact with the surface 51a (surface on which image sensor 52 is mounted) of the substrate 51 (see FIG. 16, etc.).

And in a state where the intermediate holder 542 is bridged between the lens barrel 30 and the substrate 51 (light-receiving circuit 50) and contacted, the above-described ultrasonic welding method is performed by applying ultrasonic vibration and a pressing force by the convertor 57 via the horn 55 by which the intermediate holder 543 is sucked and held (see FIG. 13) (third, and fourth processes). Therefore, even if fixing and holding of the lens barrel 30 and the substrate 51 by the adjuster 60 are released, in a state where the positional relationship optically set is maintained, the lens barrel 30 and the substrate 51 are joined together by welding via the intermediate holder 543 (see FIGS. 14, 17, etc.).

In the present embodiment, after the ultrasonic welding method using the intermediate holder 543 described above, similarly to Embodiment 1, the adhesive layer C is formed by a thermoplastic-type adhesive agent, and an adhesive gap filling method is performed (see FIG. 19 and so on). The adhesive layer C is provided circularly along an outer edge of a rear end (outside of inner edge projection part 39) of the lens barrel 30, and on the surface 51a of the substrate 51, the adhesive layer C surrounds the image sensor 52 so as not to interfere with at least an effective area (effective light-receiving area) of the light-receiving surface 52a of the image sensor 52.

The imaging device 103 according to the present embodiment has basically the same structure as the imaging device 10 according to Embodiment 1, therefore it is possible to obtain basically the same effects as Embodiment 1.

In addition, in the imaging device 103 according to the present embodiment, in the intermediate holder 543 used in the ultrasonic welding method for joining the lens barrel 30 (imaging optical system 20) and the light-receiving circuit 50 (substrate 51), each of the contact part 543d on the lens barrel side that comes into contact with the outer circumferential surface part 32a of the smaller diameter part 32 of the lens barrel 30 and the contact part 543f on the light-receiving circuit side that comes into contact with the surface 51a of the substrate 51 of the light-receiving circuit 50 is respectively formed into the spherical shape that projects from the flat surface (mounting wall surface 543c or mounting wall surface 543e), respectively, as an example of the convex shape. Therefore, it is possible to concentrate the energy for welding by ultrasonic vibration and a pressing force transmitted from the convertor 57 via the horn 55 in a smaller range (nearly one point). Accordingly, it is further reliably possible to fix the contact part 543d on the lens barrel side and the outer circumferential surface part 32a, and fix the contact part 543f on the light-receiving circuit side and the surface 51a. Therefore, it is possible to obtain a more stable optical performance.

In the imaging device 103 according to the present embodiment, in the intermediate holder 543 used in the ultrasonic welding method for joining the lens barrel 30 (imaging optical system 20) and the light-receiving circuit 50 (substrate 51), it is possible to make the contact part 543d on the lens barrel side point-contact on the outer circumferential surface part 32a and make the contact part 543f on the light-receiving circuit side point-contact on the surface 51a. Therefore, in a case of the ultrasonic welding method, it is possible to improve the degree of freedom of directions of the pressing force applied to the intermediate holder 543. In other words, if the direction of the pressing force applied to the intermediate holder 543 is inclined to a direction toward a center position of a contact portion of each of the lens barrel 30 and the light-receiving circuit 50 (substrate 51), it is possible to suitably pressure-weld the intermediate holder 543 on the lens barrel 30 and the light-receiving circuit 50 (substrate 51). Therefore, it is reliably possible to fix the contact part 543d on the lens barrel side 543d and the outer circumferential surface part 32a, and fix the contact part 543f on the light-receiving circuit side and the surface 51a. Accordingly, it is possible to obtain a more stable optical performance. In addition, from a viewpoint of performing the ultrasonic welding method, it is possible to improve the degree of freedom of a layout of the mounting wall 11 and the lens barrel 30, and improve the degree of freedom of a layout of a tool (device) for performing the ultrasonic welding method.

Therefore, in the imaging device 103 according to the present embodiment, it is possible to position and fix the lens barrel 30 and the light-receiving circuit 50 (substrate 51) with high adjustment accuracy where the positional relationship between the optical element group 40 and the image sensor 52 (its light-receiving surface 52*a*) optically positioned is maintained.

In the present embodiment, the contact part 543*f* (its end part) on the light-receiving circuit side of the wall part 543*b* of the substrate side of the intermediate holder 543 comes into contact with the surface 51*a* of the substrate 51 (surface on which the image sensor 52 is mounted); however, it can come into contact with an area other than the effective area (effective light-receiving area) on the light-receiving surface 522*a* of the image sensor 522 as in Embodiment 2, and it is not limited to the present embodiment.

In each embodiment described above, as examples of an imaging device according to the present invention, the imaging device 10, the imaging device 102, and the imaging device 103 have been explained; however, it can be an imaging device comprising: a lens barrel that holds at least one optical element; a light-receiving circuit that at least has an image sensor that obtains an image of a photographic subject formed by the optical element and a drive substrate that drives the image sensor; and a welding structure in which the lens barrel and the optical element are joined by welding, in a state where a positional relationship between the image sensor and the optical element optically positioned is maintained, wherein the welding structure has an intermediate holder where a contact part on a lens barrel side that is contacted on a contact portion of the lens barrel and a contact part on a light-receiving circuit side that is contacted on a contact portion of the light-receiving circuit are provided; a welded part on the lens barrel side that is hardened after the contact portion of the lens barrel or the contact part on the lens barrel side is softened, where the contact portion of the lens barrel and the contact part on the lens barrel side are fixed; and a welded part on the light-receiving circuit side that is hardened after the contact portion of the light-receiving circuit or the contact part on the light-receiving circuit side is softened, where the contact portion of the light-receiving circuit and the contact part on the light-receiving circuit side are fixed, and it is not limited to each embodiment described above.

In each embodiment described above, the ultrasonic welding method using the intermediate holder 54 (543) for forming the welding structure is adopted; however, if the positional relationship between the lens barrel 30 and the light-receiving circuit 50 is maintained within an allowable range to absorb an influence of a shape change of the contact part 54*d* (543*d*) on the lens barrel side and the contact part 54*f* (543*f*) on the light-receiving circuit side, that is, the intermediate holder 54 (543), due to softening (melting), by displacing (moving) the intermediate holder 54 (543) in directions getting close to the lens barrel 30 and the light-receiving circuit 50 relatively fixed, the welding structure can be formed by adopting another welding method, and it is not limited to each embodiment described above. The allowable range stated here is a state where an appropriate image can be obtained on the image sensor 52 (its light-receiving surface 52*a*) that is shifted. For example, a position shift amount in the direction of the optical axis O occurring on the image sensor 52 (its light-receiving surface 52*a*) is within the depth of focus in the optical element group 40.

Additionally, in each embodiment described above, the structure that joins the light-receiving circuit 50 (502) and the lens barrel 30 is formed by the welding structure and the adhesive gap filling structure; however, if sufficient joining strength can be obtained by the welding structure, the adhesive gap filling structure (adhesive layer C) does not need to be provided, and it is not limited to each embodiment described above.

In each embodiment described above, the L-shaped intermediate holder 54 (543) is used in the ultrasonic welding method; however, if the intermediate holder used in the ultrasonic welding method can form the contact part (54*d*, etc.) on the lens barrel side that comes into contact with the outer circumferential surface part 32*a* of the smaller diameter part 32 of the lens barrel 30 and the contact part (54*f*, etc.) on the light-receiving circuit side that comes into contact with the surface 51*a* of the substrate 51 of the light-receiving circuit 50 (light-receiving surface 522*a* of image sensor 522), for example, a cross-section of a plane perpendicular to the contact part on the lens barrel side and the contact part on the light-receiving circuit side can be formed into a rectangular shape or a triangle shape, and is not limited to each embodiment described above.

In each embodiment described above, as the intermediate holder used for the welding structure, a facing surface on a lens barrel side (mounting wall surface 54*c*) that faces the lens barrel 30 (outer circumferential surface part 32*a* of the smaller diameter part 32) and a facing surface on a light-receiving circuit side (mounting wall surface 54*e*) that faces the light-receiving circuit 50, 502 (surface 51*a* of substrate 51 or light-receiving surface 522*a* of the image sensor 522) are orthogonal to each other; however, if the image sensor 52 or the substrate 51 on which the image sensor 52 is mounted is joined to the lens barrel 30, by welding, in a state (positional relationship) where the optical element group 40 and the image sensor 52 (light-receiving surface 52*a*) are optically positioned, for example, the facing surface on the lens barrel side and the facing surface on the light-receiving circuit side can be formed at both ends on the same surface of a long plate member, and it is not limited to each embodiment above described. In this case, the facing surface on the light-receiving circuit side can be contacted (welded) on a side surface (54*f*, etc.) of the image sensor 52 (522) or the substrate 51 via the contact part on the light-receiving circuit side.

In each embodiment described above, in the ultrasonic welding method, only the contact part (54*d*, etc.) on the lens barrel side and the contact part (54*f*, etc) on the light-receiving circuit side of the intermediate holder 54 (543) is softened (melted); however, within a range where an optical function (function as electric circuit) is not lost, a contact portion of the lens barrel (outer circumferential surface part 32*a* of smaller diameter part of lens barrel 30 in each embodiment described above) and a contact portion of the light-receiving circuit (surface 51*a* of substrate 51 of light-receiving circuit 50 or light-receiving surface 522*a* of image sensor 522 in each embodiment described above) where the contact part (54*d*, etc.) on the lens barrel side and the contact part (54*f*, etc) on the light-receiving circuit side are contacted can be softened (melted), or the contact part (54*d*, etc.) on the lens barrel side, the contact part (54*f*, etc) on the light-receiving circuit side, the contact portion of the lens barrel, and the contact portion of the light-receiving circuit can be softened (melted) together, and they are not limited to each embodiment described above. It is possible to perform positioning and fixing more firmly by softening (melting) both of the contact parts and the contact portions. In the ultrasonic welding method, it is possible to make portions that are softened (melted) extremely thin along their contact surface; therefore, even in a case where the contact portion of the lens barrel and the contact portion of the light-receiving circuit are softened (melted), it is possible to avoid an influence on the optical performance in the lens barrel 30 and the light-receiving circuit 50 (substrate 51 or image sensor 522).

In each embodiment described above, in order to form the adhesive layer C in the adhesive gap filling method, the thermoplastic-type adhesive agent is used; however, if an adhesive agent can maintain the positional relationship by the ultrasonic welding method, for example, an ultraviolet-curing-type adhesive agent or other hardening-type adhesive agents can be used, and it is not limited to each embodiment described above.

In each embodiment described above, the adhesive layer C (strengthened adhesive layer) in the adhesive gap filling structure is passed through the inside of the intermediate holder 543 between the lens barrel 30 and the substrate 51 (image sensor 522) and circularly formed; however, the adhesive layer C can surround the outside of the intermediate holder 543, and is not limited to each embodiment described above. In this case, it is possible to easily perform application (filling) of an adhesive agent for forming the adhesive layer C. If the strengthened adhesive layer increases the joining strength of the lens barrel 30 and the light-receiving circuit 50 (502) fixed by the welding structure, it can be provided partially around the optical axis O, and is not limited to each embodiment described above.

In each embodiment described above, in a state where the mounting wall 11 and the lens barrel 30 are fixed, there is no other component around the outer circumferential surface part 32a of the smaller diameter part 32 (first space P1 is formed); however, if operations of positioning and fixing of the imaging device 10, that is, arrangement of the intermediate holder for the ultrasonic welding method, applying (filling) the adhesive agent for the adhesive gap filling method, ultraviolet radiation when using the ultraviolet-curing-type adhesive agent, and the like are performed, for example, the first space P1 can be a space where only a part of a space around the outer circumferential surface part 32a of the smaller diameter part 32 is open, and is not limited to each embodiment described above. That is, the first space P1 does not need to be formed entirely around the outer circumferential surface part 32a of the smaller diameter part 32.

In each embodiment described above, the lens barrel 30 and the mounting wall 11 are fixed by screwing of the thread groove 11e of the smaller hole part 11g of the mounting wall 11 and the screw thread 36 of the smaller diameter part 32 of the lens barrel 30; however, from a viewpoint of ensuring the sealing function from an optical element to an image sensor easy without being an obstacle to miniaturization, the lens barrel 30 (its first end) can be pressed and fixed in the direction of the optical axis O with respect to the mounting wall 11 by the screwing of the thread groove 11e and the screw thread 36, and fixing of the lens barrel 30 and the mounting wall 11 is not limited to each embodiment described above.

In each embodiment described above, the four flat surface parts 37 are formed on the outer circumferential surface of the smaller diameter part 32 of the lens barrel 30; however, a holding part can be formed to be capable of holding the lens barrel 30 so as to make the rotation operation around the optical axis O of the lens barrel 30 with respect to the mounting wall 11, that is, the fixing operation of the lens barrel 30 to the mounting wall 11, easy, and it is not limited to each embodiment described above.

In each embodiment described above, the optical element group 40 includes the lens 41, lens 42, lens 43, aperture 44, lens 45, lens 46 and lens 47; however, the optical element group 40 can be an optical element group that forms an image of a photographic subject in an arbitrary position for obtaining an image, has at least one optical element, and holds in the above-described lens barrel 30, and it is not limited to each embodiment described above.

According to an embodiment of the present invention, the influence of the shape change of the intermediate holder, or the contact portion of the lens barrel and the contact portion of the light-receiving circuit due to softening (melting) is absorbed by displacing (moving) the intermediate holder in the direction (pressing directions) getting close to the lens barrel and the light-receiving circuit that are relatively fixed. Therefore, in a state where the positional relationship optically set is maintained, the lens barrel and the light-receiving circuit are capable of being joined together by welding with a simple structure. Accordingly, it is possible to obtain a more suitable optical performance.

According to an embodiment of the present invention, it is possible to perform positioning and fixing of the lens barrel and the light-receiving circuit more firmly. Therefore, for example, in a case where the imaging device is mounted in a car, it is possible to tolerate a disturbance such as vibration, or the like, and obtain a stable image characteristic (optical performance).

According to an embodiment of the present, it is possible to perform the fixing of the lens barrel and the light-receiving circuit more firmly.

According to an embodiment of the present invention, since the energy for welding by ultrasonic vibration and pressing is concentrated in a smaller range, it is possible to more reliably fix the contact part on the lens barrel side and the contact portion of the lens barrel, and fix the contact part on the light-receiving circuit side and the contact portion of the light-receiving circuit. Therefore, it is possible to obtain a more stable optical performance.

According to an embodiment of the present invention, since the energy for welding by ultrasonic vibration and pressing is concentrated in a further smaller range (nearly one point), it is possible to more reliably fix the contact part on the lens barrel side and the contact portion of the lens barrel, and fix the contact part on the light-receiving circuit side and the contact portion of the light-receiving circuit.

According to an embodiment of the present invention, in a case of the ultrasonic welding method, it is possible to improve the degree of freedom of the directions of the pressing force applied to the intermediate holder. Additionally, it is possible to improve the degree of freedom of the layout of the lens barrel from a viewpoint of performing the ultrasonic welding method. Furthermore, it is possible to improve the degree of freedom of the layout of the tool (device) for performing the ultrasonic welding device.

According to an embodiment of the present invention, in a state where the positional relationship between the image sensor and the optical element optically positioned is maintained, the lens barrel and the light-receiving circuit are capable of being joined firmly.

According to an embodiment of the present invention, in a state where the positional relationship optically set is maintained, the lens barrel and the drive substrate are capable of being joined together by welding with a simple structure. And therefore, it is possible to obtain a more suitable optical performance.

According to an embodiment of the present invention, since the components for joining the lens barrel and the image sensor can be reduced, it is possible to reduce the influence of deformation due to a production error or temperature change in each component, and therefore it is possible to obtain an image characteristic with higher accuracy.

Since an imaging device according to an embodiment of the present invention is optically positioned and fixed with higher adjustment accuracy and capable of obtaining suitable optical performance, an in-vehicle camera including the imaging device is also capable of obtaining a suitable optical performance. Therefore, it is possible to appropriately support driving operation with confirmation of an image shot by the in-vehicle camera.

According to an embodiment of the present invention, it is possible to absorb the influence of the shape change of the intermediate holder, or the contact portion of the lens barrel and the contact portion of the light-receiving circuit due to softening by displacing (moving) the intermediate holder in the directions getting close to the lens barrel and the light-receiving circuit. Therefore, the lens barrel and the light-receiving circuit are capable of being joined together by welding with a simple structure in a state where the positional relationship optically set is maintained. Accordingly, it is possible to obtain a more stable optical performance.

According to an embodiment of the present invention, it is possible to perform positioning and fixing of the lens barrel and the light-receiving circuit more firmly.

Although the present invention has been described in terms of exemplary embodiments, it is not limited thereto. It should be appreciated that variations may be made in the embodiments described by persons skilled in the art without departing from the scope of the present invention as defined by the following claims.

What is claimed is:

1. A positioning and fixing method for a lens barrel and a light-receiving circuit of an imaging device, the imaging device including: the lens barrel that holds at least one optical element; and the light-receiving circuit that at least has an image sensor that obtains an image of a photographic subject formed by the optical element and a drive substrate that drives the image sensor, the method comprising:

a first process of fixing relatively the lens barrel and the light-receiving circuit in a state where the optical element and an image sensor are optically positioned;

a second process of providing an intermediate holder to be bridged between the lens barrel and the light-receiving circuit by contacting a contact part on a lens barrel side of the intermediate holder that fixes the lens barrel and the light-receiving circuit on a contact portion of the lens barrel, and contacting a contact part on a light-receiving circuit side of the intermediate holder on a contact portion of the light-receiving circuit;

a third process of softening the contact portion of the lens barrel or the contact part on the lens barrel side, and at the same time softening the contact portion of the light-receiving circuit or the contact part on the light-receiving circuit side, and pressing the intermediate holder to the lens barrel and the light-receiving circuit, in a state where a relative positional relationship between the lens barrel and the light-receiving circuit is maintained; and a fourth process of forming a welded part on the lens barrel side by hardening the contact portion of the lens barrel or the contact part on the lens barrel side that is softened, and at the same time forming a welded part on the light-receiving circuit side by hardening the contact portion of the light-receiving circuit or the contact part on the light-receiving circuit side that is softened, in a state where the relative positional relationship between the lens barrel and the light-receiving circuit is maintained.

2. The positioning and fixing method according to claim 1, wherein in the third process, the contact portion of the lens barrel and the contact part on the lens barrel side are softened, and at the same time the contact portion of the light-receiving circuit and the contact part on the light-receiving circuit side are softened, and in the fourth process, the welded part on the lens barrel side is formed by hardening the contact portion of the lens barrel and the contact part on the lens barrel side, and at the same time the welded part on the light-receiving circuit side is formed by hardening the contact portion of the light-receiving circuit and the contact part on the light-receiving circuit side.

* * * * *